(12) United States Patent
Mete

(10) Patent No.: US 12,215,799 B2
(45) Date of Patent: Feb. 4, 2025

(54) TAMPER SWITCH, TAMPER RESISTANT VALVE AND VALVE MONITOR

(71) Applicant: FST INNOVATION PTY LTD, Melbourne (AU)

(72) Inventor: Shae Mete, Melbourne (AU)

(73) Assignee: FST INNOVATION PTY LTD, Melbourne (AU)

( * ) Notice: Subject to any disclaimer, the term of this patent is extended or adjusted under 35 U.S.C. 154(b) by 0 days.

(21) Appl. No.: 18/691,771

(22) PCT Filed: Nov. 4, 2022

(86) PCT No.: PCT/AU2022/051324
§ 371 (c)(1),
(2) Date: Mar. 13, 2024

(87) PCT Pub. No.: WO2023/077195
PCT Pub. Date: May 11, 2023

(65) Prior Publication Data
US 2024/0271719 A1    Aug. 15, 2024

(30) Foreign Application Priority Data

Nov. 5, 2021  (AU) ................................ 2021903552
Jun. 20, 2022  (AU) ................................ 2022204325

(51) Int. Cl.
*F16K 35/10*    (2006.01)
*F16K 27/12*    (2006.01)
*F16K 37/00*    (2006.01)

(52) U.S. Cl.
CPC .............. *F16K 35/10* (2013.01); *F16K 27/12* (2013.01); *F16K 37/0041* (2013.01)

(58) Field of Classification Search
CPC ........ F16K 31/53; F16K 31/535; F16K 35/10; F16K 35/16; F16K 35/00; F16K 27/12;
(Continued)

(56) References Cited

U.S. PATENT DOCUMENTS 4,471,801 A * 9/1984 Lange .................... F16K 35/06
70/179
6,070,852 A * 6/2000 McDonnell ........... F02D 11/107
251/249.5

(Continued)

FOREIGN PATENT DOCUMENTS

| KR | 100835089 B1 | 6/2008 |
| KR | 200458726 Y1 | 3/2012 |
| WO | 2016040988 A1 | 3/2016 |

OTHER PUBLICATIONS

International Search Report from International Application No. PCT/AU2022/051324 dated Jan. 31, 2023.
(Continued)

*Primary Examiner* — Kenneth Rinehart
*Assistant Examiner* — Jonathan J Waddy
(74) *Attorney, Agent, or Firm* — Budzyn IP Law, LLC

(57) ABSTRACT

A tamper switch, tamper resistant valve and valve monitor are disclosed. The tamper resistant valve comprises a valve housing comprising a valve case and a valve cover, the valve case comprising a base and a wall, the valve cover removable from the valve case and the valve cover defining a housing mechanical linkage or part thereof; and a gear sleeve for fitting onto a main valve drive shaft, the gear comprising a valve mechanical linkage or part thereof for inter-fitting with the housing mechanical linkage or part thereof so the valve cover can only be removed when the valve mechanical linkage or part thereof and the housing mechanical linkage or part thereof are in an access orientation and not a secure orientation.

17 Claims, 14 Drawing Sheets

(58) Field of Classification Search
CPC ............. F16K 37/0008; F16K 37/0025; F16K 37/0041
USPC ................. 137/383, 384.2, 384.8; 251/249.5
See application file for complete search history.

(56) References Cited

U.S. PATENT DOCUMENTS

| | | | |
|---|---|---|---|
| 6,276,664 B1* | 8/2001 | Keller .................... | F16K 31/043 251/249.5 |
| 8,746,655 B1* | 6/2014 | Kennedy ............... | F16K 31/535 251/305 |
| 9,016,307 B2* | 4/2015 | Matalon .................. | F16K 7/126 251/248 |
| 2015/0247588 A1* | 9/2015 | Matalon ................ | F16K 35/025 137/556 |
| 2017/0356565 A1* | 12/2017 | Kwasniewski ....... | F16K 31/535 |
| 2022/0221062 A1* | 7/2022 | Kennedy ............. | F16K 27/0218 |

OTHER PUBLICATIONS

Written Opinion of the International Searching Authority from International Application No. PCT/2022/051324 dated Jan. 31, 2023.

\* cited by examiner

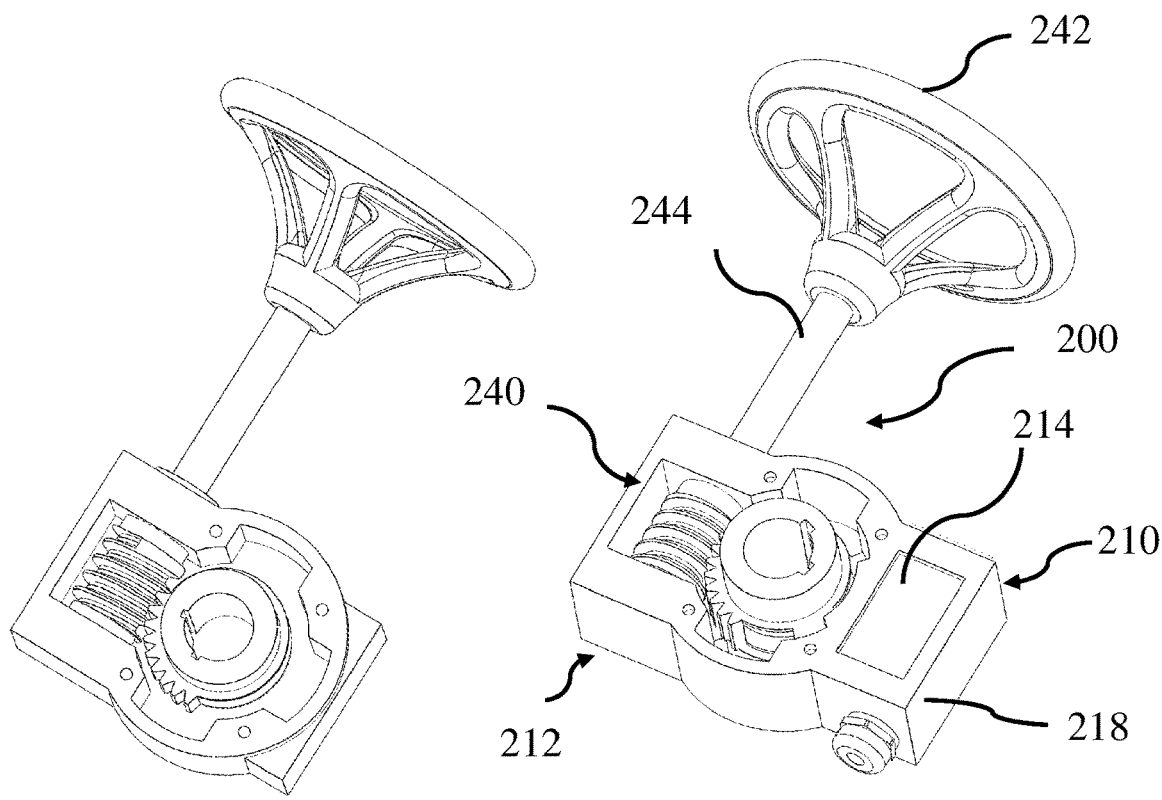
(PRIOR ART)
FIGURE 3
FIGURE 4A
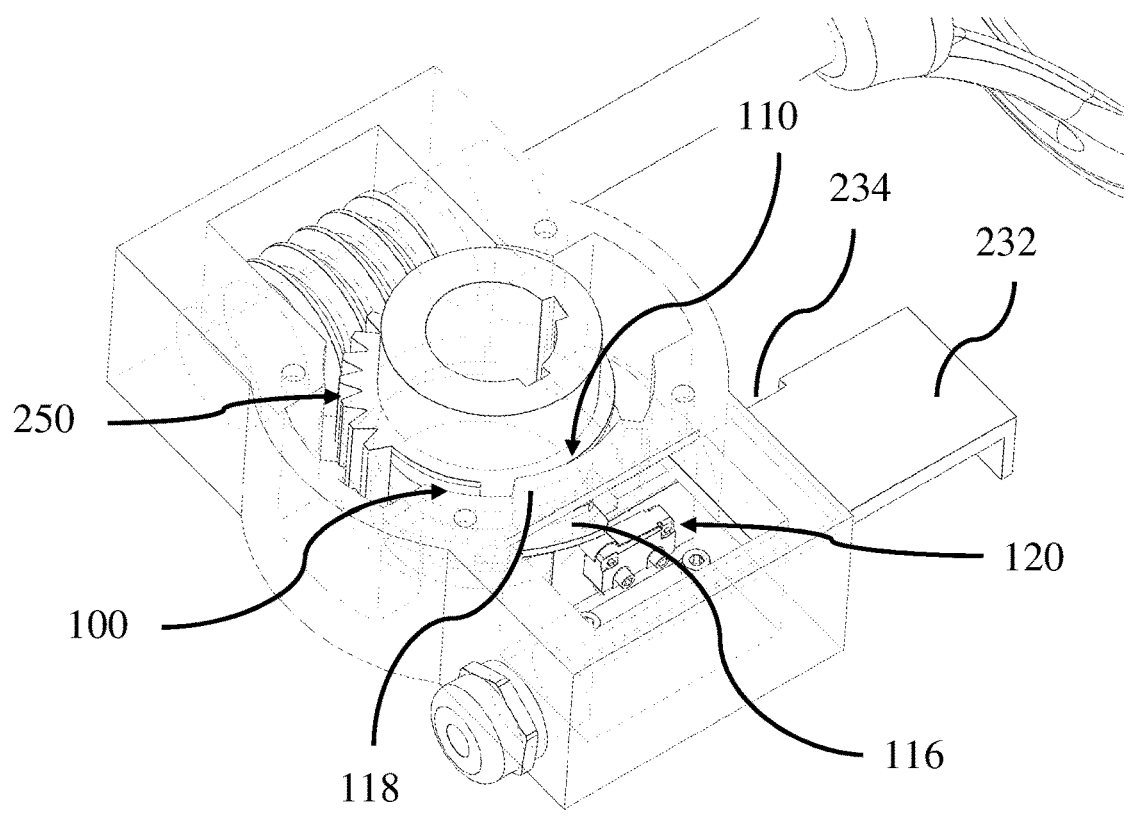
FIGURE 4B

TAMPER SWITCH, TAMPER RESISTANT VALVE AND VALVE MONITOR

CROSS-REFERENCE TO RELATED APPLICATIONS

This Application is a National Stage Application under 35 U.S.C. § 371 of PCT Application No. PCT/AU2022/051324, filed Nov. 4, 2022, which claims priority to Australian Patent Application No. 2022204325, filed Jun. 20, 2022, and to Australian Patent Application No. 2021903552, filed Nov. 5, 2021, the entire contents of which are incorporated by reference herein.

FIELD OF THE INVENTION

The present invention relates to a tamper switch comprising one or more switches disposed to be in contact with a valve cover, the valve cover removable from a valve case wherein the one or more switches are configured to be disposed within a valve housing and located so separation of the valve cover from the valve case triggers at least one of the one or more switches. The present invention also relates to a tamper resistant valve comprising an inter-fitting case and cover which cannot be disassembled without triggering a switch. The present invention further relates to a valve and a valve monitor comprising one or more switches disposed to be in contact with a tamper prevention actuator, the tamper prevention actuator disposed on or integral with a main valve drive shaft, the tamper prevention actuator triggered by movement of the main valve drive shaft wherein the one or more switches are configured to be disposed within a valve housing and located so separation of the tamper prevention actuator from the one or more switches triggers respective switches of the one or more switches. In one particular embodiment, the valve and valve monitor further comprise a mechanical linkage or part thereof preventing access to the valve unless the valve is in a designated position. In another particular embodiment, this invention relates to a valve and valve monitor comprising one or more switches triggered by valve moment and an inter-fitting mechanical linkage comprising a valve component and a housing component preventing a housing cover from being removed unless the valve is in the designated position.

BACKGROUND TO THE INVENTION

Fire protection systems make use of valves to isolate the fire sprinkler system within a building. The valve may be shut to stop water supply to the sprinkler system to facilitate works to the system. Some valves provide a visual indication of open or closed valve condition. A warehouse or a high-rise building typically includes about fifty (50) valves in the sprinkler and fire hydrant installations that are required to be electronically monitored so that an automatic alarm is generated if the valve is operated.

Various methods of electronic valve monitor devices have been utilized to prevent operation of the valve from going unnoticed or to provide a degree of tamper resistance to prevent unauthorized access to the valve such that the monitoring equipment can be defeated. Electronic valve monitoring and preventing unauthorised access is highly desirable because an arsonist may wish to close the valve to prevent the sprinkler system from extinguishing a fire. Also, maintenance personnel may seek to deliberately defeat the monitor to avoid tedious procedural requirements. Defeating monitors has resulted in unnoticed, inadvertent isolation of fire protection systems for extended periods.

Electronic valve monitors have been commonly used in sprinkler and hydrant systems as a way to prevent inadvertent or malicious isolation of these systems. Codes and Standards require electronic valve monitors in more and more applications in fire protection globally.

To date, two methods have been used to perform valve monitoring. These can be categorised as internal and external. Internal valve monitoring is achieved by using a switch inside the gearbox of a valve. The internal switch is activated when internal components move upon operation of the valve. External valve monitoring is performed by bolting on an external switch device to a standard non-monitored valve. The external valve monitor uses a switch to detect the movement of external parts of the valve when the valve is operated.

Two Classes of tamper resistance are possible with electronic valve monitors. Class B is considered Standard Security and simply requires that the valve automatically generates an alarm when the valve is operated. Class A is considered Enhanced Security which requires the same as Class B, but also requires that an alarm is automatically generated if an attempt is made to access the internals of the valve, or remove the valve monitoring device itself.

Many sprinkler manufacturers make Class B valves. All are similar and work using a simple switch activated by the mechanical movement in the gearbox. When the valve is turned, the switch is operated, and an alarm is signalled at the fire alarm control panel. The inclusion of the switches is simple and therefore Class B monitors are cost-effective but they only provide signalling of valve operation and no tamper protection.

Class B valves can be upgraded to Class A. This conversion is accomplished by fitting a special external electronic device and the internal switch is then not used. In Australia, this device is manufactured by Amtron. Amtron valve monitors require some modification to the parent valve and increase the cost to the end user of several hundred dollars per valve. These external devices are large and require careful installation and mounting. Being external, they are subject to impact sometimes resulting in false alarms and difficulty resetting.

The push for cheaper Class A devices has led to relatively low performing alternate solutions, which have been provided in order to avoid the expense of approved Class A devices such as, the Amtron valve monitor. Some alternate solutions are not approved by appropriately recognized bodies as meeting the standards required by Class A. There are concerns about the compliance of these alternate solutions and methods have been publicly revealed to defeat these and even the approved Class A devices.

Both Class B and Class A valves are able to be defeated completely if the whole gearbox assembly is able to be removed from the valve body. Removing the gearbox provides direct access to the main valve shaft which can then be operated without any alarm being generated. Manufacturers have been mitigating this by bolting the gearbox on using 'anti-tamper' bolts. Now days, such anti-tamper tooling is commonly available which significantly reduces the degree of tamper resistance.

There remains a need for alternative mechanisms to monitor valves and/or provide alternative anti-tamper mechanisms.

The reference to any prior art in this specification is not, and should not be taken as, an acknowledgement or any form of suggestion that the prior art forms part of the common general knowledge.

SUMMARY OF THE INVENTION

Generally, embodiments of the present invention relate to a tamper switch, a valve and/or a valve monitor.

In one broad form, the invention relates to a tamper resistant valve. The tamper resistant nature may result from inter-fitting case and valve components which cannot be disassembled without triggering a switch. The switch may activate an alarm. The inter-fitting may comprise a mechanical linkage between a housing mechanical linkage or part thereof and a valve mechanical linkage or part thereof.

In another broad form, the invention relates to tamper switch, a valve and/or a valve monitor comprising one or more switches triggered by movement of the valve cover and/or by valve movement. The triggering by movement of the valve cover may be when the cover is removed, or partially removed from the valve case. The triggering by valve movement may be by triggering by the valve mechanism, optionally the triggering is by the main valve drive shaft.

In a particular embodiment, the valve and valve monitor comprise a mechanical linkage or part thereof preventing access to the interior of the valve unless the valve is in a designated position. The movement of the valve may concomitantly move the mechanical linkage.

The tamper switch, valve and valve monitor of the invention is of particular advantage as it may prevent, or at least limit, unauthorised access. Moreover, no special training is required, and the valve and valve monitor is a suitably low-cost device that it essentially eliminates, or at least reduces, the need for a Class B, or non tamper-resistant, category of valves all together.

In a first aspect, although it need not be the only or indeed the broadest aspect, the invention relates to a tamper resistant valve comprising:
a valve housing comprising a valve case and a valve cover, the valve case comprising a base and a wall, the valve cover removable from the valve case and the valve cover defining a housing mechanical linkage or part thereof; and
a gear sleeve for fitting onto a main valve drive shaft, the gear comprising a valve mechanical linkage or part thereof for inter-fitting with the housing mechanical linkage or part thereof so the valve cover can only be removed when the valve mechanical linkage or part thereof and the housing mechanical linkage or part thereof are in an access orientation and not a secure orientation.

In a second aspect the invention provides a tamper switch comprising:
one or more switches disposed to be in contact with a valve cover, the valve cover removable from a valve case wherein the one or more switches are configured to be disposed within a valve housing and located so separation of the valve cover from the valve case triggers at least one of the one or more switches.

In a third aspect, the invention provides a valve comprising:
a housing, the housing comprising a valve case and a valve cover;
a valve mechanism configured to move a valve member from an open position to a closed position the valve member movement caused by motion of a main valve drive shaft; and
a tamper switch comprising one or more switches, the one or more switches disposed to be in contact with the valve cover, the valve cover removable from the valve case wherein the one or more switches are configured to be disposed within the valve housing and located so separation of the valve cover from the valve case triggers at least one of the one or more switches.

In a fourth aspect, the invention provides a valve monitor comprising:
one or more switches disposed to be in contact with a tamper prevention actuator, the tamper prevention actuator disposed on or integral with a main valve drive shaft, the tamper prevention actuator concomitantly moved by movement of the main valve drive shaft, wherein the one or more switches are configured to be disposed within a valve housing and the one or more switches are located so separation of the tamper prevention actuator from the one or more switches triggers a respective switch or switches of the one or more switches.

In a particular embodiment of the second aspect or fourth aspect the valve monitor comprises a valve mechanical linkage or part thereof, the valve mechanical linkage or part thereof moveable from a secure orientation which prevents access to the valve when the valve is not in a desired position and an access orientation which allows access to the valve when the valve is in the desired position. The valve mechanical linkage or part thereof may inter-fit with a housing mechanical linkage or part thereof to combine in a mechanical linkage, the mechanical linkage moveable from a secure orientation which prevents access to said valve when the valve is not in a desired position and an access orientation which allows access to the valve when the valve is in the desired position.

In a fifth aspect, the invention provides a valve comprising:
a housing, the housing comprising a valve case and a valve cover;
a valve mechanism configured to move a valve member from an open position to a closed position the valve member movement caused by movement of a main valve drive shaft; and
a valve monitor comprising one or more switches, the one or more switches disposed to be in contact with a tamper prevention actuator, the tamper prevention actuator disposed on or integral with the main valve drive shaft, the tamper prevention actuator concomitantly moved by the movement of the main valve drive shaft wherein the one more switches are disposed within the housing and located so separation of the tamper prevention actuator from the one or more switches triggers a respective switch or switches of the one or more switches.

In a particular embodiment of the third or fifth aspect, the housing comprises a housing mechanical linkage or part thereof and the valve comprises a valve mechanical linkage or part thereof inter-fitting with the housing mechanical linkage or part thereof to combine in a mechanical linkage, the mechanical linkage moveable from a secure orientation which prevents access to the valve when the valve is not in a desired position and an access orientation which allows access to the valve when the valve is in the desired position.

In a sixth aspect, the invention provides a method of monitoring a fire protection system, such as a fire sprinkler system, the method comprising fitting or retrofitting the valve monitor of the second aspect or the fourth aspect to a valve comprised in the fire protection system or installing the valve of the first aspect or the third aspect or the fifth aspect to the fire protection system.

In a seventh aspect, the invention provides a method of preventing unauthorised access to a fire protection system, the method comprising:
fitting or retro-fitting a valve housing comprising a valve case and a valve cover, the valve case comprising a base and a wall, the valve cover removable from the valve case and the valve cover defining a housing mechanical linkage or part thereof; and
fitting or retro-fitting a gear onto a main valve drive shaft, the gear comprising a valve mechanical linkage or part thereof for inter-fitting with the housing mechanical linkage or part thereof so the valve cover can only be removed when the valve mechanical linkage or part thereof and the housing mechanical linkage or part thereof are in an access orientation and not a secure orientation.

In an eighth aspect the invention provides a method of preventing unauthorised access to a fire protection system, the method comprising:
fitting or retro-fitting one or more switches to a shut-off valve within the fire protection system, the one or more switches disposed to be in contact with a valve cover, the valve cover removable from a valve case wherein the one or more switches are configured to be disposed within a valve housing and located so separation of the valve cover from the valve case triggers at least one of the one or more switches.

In a ninth aspect the invention provides a method of preventing unauthorised access to a fire protection system, the method comprising:
fitting or retro-fitting one or more switches to a shut-off valve within the fire protection system, the one or more switches disposed to be in contact with a tamper prevention actuator, the tamper prevention actuator disposed on or integral with a main valve drive shaft, the tamper prevention actuator concomitantly moved by movement of the main valve drive shaft, wherein the one or more switches are configured to be disposed within a valve housing and the one or more switches are located so separation of the tamper prevention actuator from the one or more switches triggers a respective switch or switches of the one or more switches.

In a particular embodiment of the eighth or ninth aspect, the method further comprises:
providing a valve mechanical linkage or part thereof, the valve mechanical linkage or part thereof moveable from a secure orientation which prevents access to the valve when the valve is not in a desired position and an access orientation which allows access to the valve when the valve is in the desired position.

In a tenth aspect the invention provides a method of preventing unauthorised access to a fire protection system, the method comprising:
installing a shut off valve into the fire protection system, the shut off valve comprising:
a valve housing comprising a valve case and a valve cover, the valve case comprising a base and a wall, the valve cover removable from the valve case and the valve cover defining a housing mechanical linkage or part thereof; and
a gear for fitting onto a main valve drive shaft, the gear comprising a valve mechanical linkage or part thereof for inter-fitting with the housing mechanical linkage or part thereof so the valve cover can only be removed when the valve mechanical or part thereof linkage and the housing mechanical linkage or part thereof are in an access orientation and not a secure orientation.

In an eleventh aspect the invention provides a method of preventing unauthorised access to a fire protection system, the method comprising:
installing a shut off valve into the fire protection system, the shut off valve comprising:
a housing, the housing comprising a valve case and a valve cover;
a valve mechanism configured to move a valve member from an open position to a closed position the valve member movement caused by motion of a main valve drive shaft; and
a tamper switch comprising one or more switches, the one or more switches disposed to be in contact with a valve cover, the valve cover removable from a valve case wherein the one or more switches are configured to be disposed within a valve housing and located so separation of the valve cover from the valve case triggers at least one of the one or more switches.

In a twelfth aspect the invention provides a method of preventing unauthorised access to a fire protection system, the method comprising:
installing a shut off valve into the fire protection system, the shut off valve comprising:
a housing, the housing comprising a valve case and a valve cover;
a valve mechanism configured to move a valve member from an open position to a closed position the valve member movement caused by motion of a main valve drive shaft; and
a valve monitor comprising one or more switches, the one or more switches disposed to be in contact with a tamper prevention actuator, the tamper prevention actuator disposed on or integral with the main valve drive shaft, the tamper prevention actuator concomitantly moved by movement of the main valve drive shaft, wherein the one or more switches are configured to be disposed within a valve housing and the one or more switches are located so separation of the tamper prevention actuator from the one or more switches triggers a respective switch or switches of the one or more switches.

In a particular embodiment of the eleventh or twelfth aspect, the housing further comprises a housing mechanical linkage or part thereof and the valve comprises a valve mechanical linkage or part thereof inter-fitting with the housing mechanical linkage or part thereof to combine in a mechanical linkage, the mechanical linkage moveable from a secure orientation which prevents access to the valve when the valve is not in a desired position and an access orientation which allows access to the valve when the valve is in the desired position.

In a thirteenth aspect the invention provides a method of manufacturing a tamper switch, the method comprising:
providing one or more switches disposed to be in contact with a valve cover, the valve cover removable from a valve case wherein the one or more switches are configured to be disposed within a valve housing and located so separation of the valve cover from the valve case triggers at least one of the one or more switches.

In a fourteenth aspect the invention provides a method of manufacturing a valve monitor, the method comprising:

providing one or more switches disposed to be in contact with a tamper prevention actuator, the tamper prevention actuator disposed on or integral with a main valve drive shaft, the tamper prevention actuator concomitantly moved by movement of the main valve drive shaft, wherein the one or more switches are configured to be disposed within a valve housing and the one or more switches are located so separation of the tamper prevention actuator from the one or more switches trigger a respective switch or switches of the one or more switches.

In a particular embodiment of the thirteenth or fourteenth aspects, the method further comprises:

providing a valve mechanical linkage or part thereof, the valve mechanical linkage or part thereof moveable from a secure orientation which prevents access to the valve when the valve is not in a desired position and an access orientation which allows access to the valve when the valve is in the desired position.

In a fifteenth aspect the invention provides a method of manufacturing a tamper resistant valve, the method comprising:

providing a valve housing comprising a valve case and a valve cover, the valve case comprising a base and a wall, the valve cover removable from the valve case and the valve cover defining a housing mechanical linkage or part thereof; and providing a gear for fitting onto a main valve drive shaft, the gear comprising a valve mechanical linkage or part thereof for inter-fitting with the housing mechanical linkage or part thereof so the valve cover can only be removed when the valve mechanical linkage or part thereof and the housing mechanical linkage or part thereof are in an access orientation and not a secure orientation.

In a sixteenth aspect the invention provides a method of manufacturing a tamper switch, the method comprising:

providing a valve monitor comprising one or more switches, the one or more switches disposed to be in contact with a valve cover, the valve cover removable from a valve case wherein the one or more switches are configured to be disposed within a valve housing and located so separation of the valve cover from the valve case triggers at least one of the one or more switches.

In one embodiment of the sixteenth aspect, the method further comprises:

providing a valve cover.

In a seventeenth aspect the invention provides a method of manufacturing a valve, the method comprising:

providing a housing comprising a valve case and a valve cover;

providing a valve mechanism configured to move a valve member from an open position to a closed position the valve member movement caused by motion of a main valve drive shaft; and providing a valve monitor comprising one or more switches, the one or more switches disposed to be in contact with a tamper prevention actuator, the tamper prevention actuator disposed on or integral with the main valve drive shaft, the tamper prevention actuator concomitantly moved by the motion of the main valve drive shaft wherein the one or more switches are disposed within the housing and located so separation of the tamper prevention actuator from the one or more switches triggers a respective switch or switches of the one or more switches.

In a particular embodiment of the sixteenth or seventeenth aspect, the method further comprises providing the housing with a housing mechanical linkage or part thereof and providing a valve mechanical linkage or part thereof inter-fitting with the housing mechanical linkage or part thereof to combine in a mechanical linkage, the mechanical linkage moveable from a secure orientation which prevents access to the valve when the valve is not in a desired position and an access orientation which allows access to the valve when the valve is in the desired position.

In an eighteenth aspect the invention provides a method of fitting or retrofitting the anti-tamper valve of the first aspect into a fire protection system.

In a nineteenth aspect the invention provides a method of fitting or retrofitting the valve monitor of the second or fourth aspect into a fire protection system.

In a twentieth aspect, the invention provides a method of fitting or retrofitting the valve of the third or fifth aspect into a fire protection system.

In a twenty-first aspect, the invention provides a kit for converting a valve into a tamper resistant valve, the kit comprising:

a valve housing comprising a valve case and a valve cover, the valve case comprising a base and a wall, the valve cover removable from the valve case and the valve cover defining a housing mechanical linkage or part thereof; and a gear for fitting onto a main valve drive shaft, the gear comprising a valve mechanical linkage or part thereof for inter-fitting with the housing mechanical linkage or part thereof so the valve cover can only be removed when the valve mechanical linkage or part thereof and the housing mechanical linkage or part thereof are in an access orientation and not a secure orientation.

In a twenty-second aspect, the invention provides a kit for converting a valve into a tamper resistant valve, the kit comprising one or more switches to be installed so the one or more switches are disposed to be in contact with a valve cover, the valve cover removable from a valve case wherein the one or more switches are configured to be disposed within a valve housing and located so separation of the valve cover from the valve case triggers at least one of the one or more switches.

In a twenty-third aspect, the invention provides a kit for converting a valve into a tamper resistant valve, the kit comprising one or more switches to be installed so the one or more switches are disposed to be in contact with a tamper prevention actuator, the tamper prevention actuator disposed on or integral with a main valve drive shaft, the tamper prevention actuator triggered by movement of the main valve drive shaft, wherein the one or more switches are configured to be disposed within a valve housing and the one or more switches are located so separation of the tamper prevention actuator from the one or more switches triggers a respective switch or switches of the one or more switches.

In a particular embodiment of the twenty-second or twenty-third aspect, the kit further comprises a valve mechanical linkage or part thereof, the valve mechanical linkage or part thereof to be installed so it is moveable from a secure orientation which prevents access to the valve when the valve is not in a desired position and an access orientation which allows access to the valve when the valve is in the desired position.

In one embodiment of any one of the above aspects, the access orientation triggers a switch. The switch may make contact with a tamper prevention actuator, the tamper prevention actuator concomitantly moved with main valve drive shaft rotation. The switch may be triggered by movement of the tamper prevention actuator.

According to any one of the above aspects, the housing mechanical linkage or part thereof may be defined on an insert, the insert adapted to be applied to a valve cover.

According to any one of the above aspects, a retainer for application to the main valve drive shaft may be comprised. The retainer may prevent removal of the one or more component such as, the valve case and/or the gear, from the main valve drive shaft. The retainer may comprise an anti-tamper retainer or one-way retainer such that once applied it is difficult to remove. The retainer may interact with one or more mechanical feature disposed on the main valve drive shaft. The one-way retainer may comprise one or more angled flange. The one or more angled flange may interact with a helical groove of the main valve drive shaft to prevent or hinder removal of the retainer. The retainer may fit into a groove disposed on the main valve drive shaft. The retainer may comprise a circlip.

According to any one of the above aspects, a visual indicia may indicate a switch status. The visual indicia may comprise a light such as, an LED (light emitting diode). The visual indicia may be operatively connected to the switch and/or one or more Fire Alarm Control Panel.

According to any one of the above aspects, a transparent window may be comprised in the case. The transparent window may be positioned to allow viewing of the visual indicia. The transparent window may comprise an IP65 clear lens.

In one particular embodiment of any one of the above aspects, the movement of the valve concomitantly moves the valve mechanical linkage or part thereof. The valve movement may be from open to closed. The valve mechanical linkage or part thereof movement may be from a secure orientation which prevents access to the valve when the valve is not in a desired position and an access orientation which allows access to the valve when the valve is in the desired position.

In another particular embodiment of any one of the above aspects, the one or more switches are triggered directly by valve moment. The direct triggering may comprise triggering by movement directly of a valve main drive shaft. The direct triggering may be by the tamper prevention actuator that is disposed on or integral with the main valve drive shaft and not by a component external of the housing. The tamper prevention actuator may be integral with the valve actuator or may be attached to or attached onto the valve actuator. The tamper prevention actuator may comprise a sleeve, cam, arm, nut, or gear actuated by the valve mechanism. The sleeve, cam, arm nut, or gear may be integral with the valve main drive shaft or fitted over the valve main drive shaft. The sleeve, cam, arm, nut or gear may move concomitantly with the valve main drive shaft. The movement of the valve main drive shaft and/or the tamper protection actuator may be a rotation. The sleeve, cam, arm, nut or gear may comprise one or more of: one or more fenestration; one or more flange and one or more teeth.

According to any one of the above aspects, the movement of the tamper prevention actuator activates a respective switch or switches of the one or more switches. The activation may turn on an alarm. The alarm may be an aural and/or visual alarm. The activation of the one or more switches and/or turning on of the alarm may also send one or more electronic communication indicating that the one or more switches has been activated and/or the alarm has been turned on.

According to any one of the above aspects, the gear may take any form such as, a toothed gear, a gear with no teeth, a sleeve or a component disposed on or integral with the main valve drive shaft. The gear may comprise an annulus. The gear may be a one-piece component or may be comprised of two or more pieces. The two or more pieces may be disposed in different heights along the main valve drive shaft. The one-piece gear may have one or more tamper prevention actuator and/or one or more valve mechanical linkage or part thereof disposed at different heights along its length.

In one particular embodiment of any one of the above aspects, the gear may be integral with the main valve drive shaft.

In another particular embodiment of any one of the above aspects, the gear may define or comprise the tamper prevention actuator.

In another embodiment of any one of the above aspects, the one or more switches may be triggered by movement of an alarm flange, the alarm flange extending from the tamper prevention actuator. The movement of the alarm flange may be from a position in which contact is made with the one or more switches to a position in which no contact is made with the one or more switches. The movement may be a rotation.

In still another embodiment of any one of the above aspects, the one or more switches may be triggered by movement of a tamper prevention actuator contact surface. The tamper prevention actuator contact surface may be on an external part of the tamper prevention actuator, optionally in the form of a sleeve. The tamper prevention actuator may house a fenestration in which the one or more switches extend. The movement may be a rotation.

According to one embodiment of any one of the above aspects, the one or more switches may be electronic. The one or more switches may activate an alarm. The one or more switches may also be triggered by removal of the valve cover. The one or more switches may comprise a respective switch box. The respective switch boxes may comprise a sidewall forming a cavity. A switch actuator and/or tamper prevention actuator, or part thereof, may be disposed in the cavity. The sidewall may comprise an access port for the main valve drive shaft and/or sleeve to extend out of. The one or more switches may comprise a switch actuator such as, a lever. The switch actuator may be contacted by the tamper prevention actuator. The switch actuator may comprise a contoured outer surface, optionally convex, at least part of which sits the in fenestration. The switch actuator is disposed so that unscrewing the switch box and/or movement in any direction will trigger the switch and generate an alarm. The switch actuator may comprise a protrusion or a protruding element.

In another embodiment of any one of the above aspects, the one or more switches may be disposed on an inside surface of a valve cover, and may thereby comprise an anti-tamper switch. The one or more switches may be disposed on the inside surface with one or more switch fastener. The fastener may comprise a bracket.

In still another embodiment of any one of the above aspects, the one or more switches comprise a biasing mechanism which the tamper prevention actuator must act against to activate respective switches of the one or more switch.

The biasing mechanism may comprise a bias such as, a spring, lever, plate or prong. The biasing mechanism may be positioned between the tamper prevention actuator and the switch actuator.

In another embodiment of any one of the above aspects, the valve mechanical linkage or part thereof may be integral with the valve actuator or may be attached to or attached onto the valve actuator. The valve mechanical linkage or part thereof may comprise a sleeve, cam, arm, nut, flange or gear actuated by the valve mechanism. The sleeve, cam, arm, nut, flange or gear may be integral with the valve main drive shaft or fitted over the valve main drive shaft. The valve mechanical linkage or part thereof may be integral with or may be attached to or attached onto the tamper prevention actuator.

In one embodiment of any one of the above aspects, the valve mechanical linkage or part thereof comprises one or more linkage flange extending from a valve actuator or tamper prevention actuator. The one or more linkage flange may comprise two linkage flanges disposed on opposing sides of the gear or valve mechanical linkage. The one or more linkage flange may move from a position in which there is no inter-fitting between the valve mechanical linkage or part thereof and the housing mechanical linkage or part thereof in the desired position and a position in which there is inter-fitting between the valve mechanical linkage or part thereof and the housing mechanical linkage or part thereof when the valve is not in the desired position. The inter-fitting may prevent removal of the valve cover. The inter-fitting may be facilitated by a relief in the valve housing. The relief may be comprised in the valve case; valve cover; or a housing insert. The housing insert may comprise a door or access panel such as, a sliding door or sliding access panel. The alarm flange may extend further from the tamper prevention actuator than the linkage flange.

In another embodiment of any one of the above aspects, the valve mechanical linkage or part thereof comprises one or more bayonet linkage component. The one or more bayonet linkage component may inter-fit with one or more housing bayonet linkage component. The valve monitor bayonet linkage may comprise one or more pins. The one or more pins may extend from the tamper prevention actuator; main valve drive shaft or the tamper prevention actuator. The valve mechanical linkage or part thereof housing the one or more pins may comprise a cap for installation on the main valve drive shaft. The housing linkage may comprise a boss housing a slot dimensioned to receive the one or more pins. The slot may be dimensioned to allow insertion in an entry orientation and rotation into another orientation that does not allow removal, removal requiring rotation back to the entry orientation. The slot may comprise respective L-shape or T-shape components to restrict movement of the one or more pins.

In one embodiment of any of the above aspects, the housing mechanical linkage or part thereof is disposed on the housing. The housing mechanical linkage or part thereof may be disposed on the valve cover, optionally the inside surface of the valve cover.

According to any one of the above aspects, in one general embodiment of the access orientation, the valve mechanical linkage or part thereof and housing mechanical linkage or part thereof are not seated or otherwise connected so the mechanical linkage is not effected and extraction of valve mechanical linkage or part thereof from housing mechanical linkage or part thereof is possible.

According to any one of the above aspects, in one general embodiment of the secure orientation, the valve mechanical linkage or part thereof and housing mechanical linkage or part thereof are seated or otherwise connected to the mechanical linkage or part thereof is effected and extraction of the valve mechanical linkage or part thereof from housing mechanical linkage or part thereof is not possible.

According to any one of the above aspects, in one embodiment of the access orientation, the one or more pin of the valve mechanical linkage or part thereof is seated in slot and extraction of valve mechanical linkage or part thereof from housing mechanical linkage or part thereof is possible because one or more pin has not been rotated into one or more locking track.

In one embodiment of the secure orientation according to any one of the above aspects, the one or more pin of the valve mechanical linkage or part thereof has been rotated from a position seated in the slot into the one or more locking tracks so extraction of valve mechanical linkage or part thereof from housing mechanical linkage or part thereof is not possible.

In another embodiment of the access orientation according to any one of the above aspects, the linkage flange of the valve mechanical linkage or part thereof is not seated in a relief and extraction of valve mechanical linkage or part thereof from housing mechanical linkage or part thereof is possible because linkage flange has not been rotated into the relief.

In another embodiment of the secure orientation according to any one of the above aspects, the linkage flange of the valve mechanical linkage or part thereof has been rotated into a position seated in a relief so that extraction of valve mechanical linkage or part thereof from housing mechanical linkage or part thereof is not possible.

In another embodiment of any one of the above aspects, the valve comprises a valve actuator. The valve actuator may comprise a cam, wheel or gear driven by a valve handle or valve handle drive shaft. The valve actuator may be integral with or otherwise drive a valve main drive shaft. The valve main drive shaft may be seated in the wheel or gear.

In another embodiment of any one of the above aspects, the valve comprises a housing. The valve housing may comprise a valve case and a valve cover. The valve case may comprise a base and a wall. The wall may be a continuous wall. The valve cover may be attached to the valve case with one or more fastener. The valve cover may be removable from the valve case. The valve cover may define a valve cover aperture. The valve cover aperture may be for passage of the gear. The valve cover may define the housing mechanical linkage or part thereof.

According to yet another embodiment of any one of the above aspects, the cover may comprise a stopper to prevents the cover being turned relative to the case. The stopper may comprise a protrusion, a protruding section, a fastener or mating component. The stopper may sit below the uppermost level of the case.

According to any one of the above aspects, the valve may further comprise a an external indicator The external indicator may be in the form of a knob and may be located on the outside of housing. Turning of the housing main valve drive shaft and concomitantly the valve mechanical linkage or part thereof may also turn the external indicator to relay the valve status.

According to any one of the above aspects, a further switch may be comprised, the further switch triggered by removal of the valve cover or relative movement of the valve cover and valve case.

In another embodiment of any one of the above aspects, the desired position is the valve being open.

According to any one of above aspects, the one or more switches comprises one, two, three, four, five, six, seven, eight, nine or ten switches.

Further aspects and/or features of the present invention will become apparent from the following detailed description.

According to any one of the above aspects the valve and valve monitor are for a fire protection system and/or a fire sprinkler system.

BRIEF DESCRIPTION OF THE DRAWINGS

In order that the invention may be readily understood and put into practical effect, reference will now be made to embodiments of the present invention with reference to the accompanying drawings, wherein like reference numbers refer to identical elements. The drawings are provided by way of example only, wherein:

FIG. 3: shows another prior art valve.

Figure 1A:
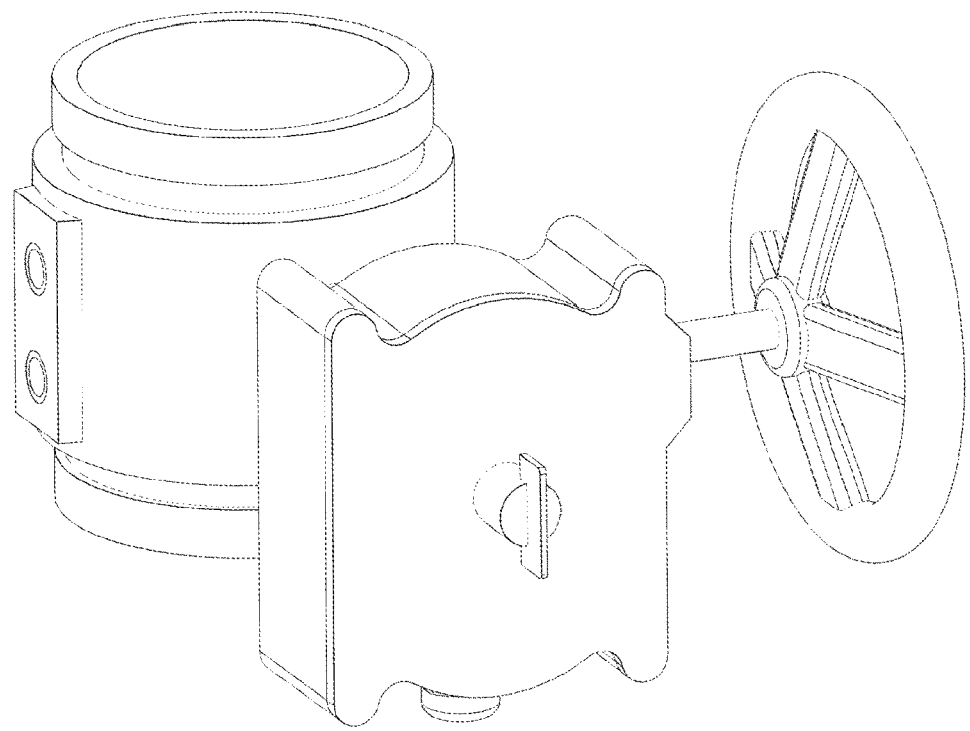
FIGS. 1A and 1B: show a prior art valve.

Skilled addressees will appreciate that elements in the drawings are illustrated for simplicity and clarity and have not necessarily been drawn to scale. For example, the relative dimensions of some elements in the drawings may be distorted to help improve understanding of embodiments of the present invention.

TABLE OF PARTS

| 100 | Valve monitor | 200 | Valve |
|---|---|---|---|
| 110 | tamper prevention actuator | 210 | housing |
| 111 | contact surface | 212 | valve case |
| 112 | sleeve | 214 | valve cover |
| 114 | fenestration | 215 | inside surface |
| 116 | alarm flange | 216 | base |
| 117 | cam | 218 | wall |
| | | 220 | valve cover aperture |
| | | 222 | external indicator |
| | | 224 | window |
| | | 226 | Stopper |
| 120 | switch | 230 | housing mechanical linkage or part thereof |
| 121 | biasing mechanism | 232 | housing insert |
| 122 | switch box | 234 | Relief |
| 123 | sidewall | 236 | Boss |
| 124 | access port | 238 | Slot |
| | | 238 | locking track |
| 125 | cavity | 240 | valve mechanism |
| 126 | switch actuator | 242 | valve handle |
| 127 | one or more connection | 244 | valve handle drive shaft |

-continued

TABLE OF PARTS

| 128 | lever | 246 | main valve drive shaft |
|---|---|---|---|
| 129 | switch fastener | 248 | helical groove |
| 150 | further switch | | |
| 152 | further valve actuator | | |
| 290 | valve mechanical linkage or part thereof | 250 | valve actuator |
| 292 | linkage flange | 252 | Cam |
| 294 | cap | 254 | Gear |
| 296 | pins | 256 | Annulus |
| 150 | further switch | 260 | valve member |
| 152 | further valve actuator | 280 | mechanical linkage |
| 300 | kit | 400 | Conduit |

DETAILED DESCRIPTION OF THE INVENTION

Embodiments of the present invention relate to a tamper switch, a valve and valve monitor. Although the invention will be described with reference to a fire safety tamper switch, valve and fire safety valve monitor, the invention is not so limited. Advantageously, in one embodiment of the present invention the tamper switch, valve and valve monitor provide anti-tamper functionality.

In one particularly advantageous embodiment of the invention, the tamper switch and valve monitor may be fitted, or retro-fitted to existing valves or incorporated into the design of existing valve types, to convert a Class B valve, that is a valve with no anti-tamper protection, into a Class A valve, that is, one that is tamper resistant. The provision of an anti-tamper switch and valve in such a cost-effective and convenient manner is of significant advantage. This is particularly in view of the risk posed by the threat of valve tampering, whether by a malicious actor such as, an arsonist, or fire safety or other technician wishing to bypass safety features.

The invention provides, in one embodiment, a valve and valve monitor comprising one or more switches triggered by valve movement. As will be elucidated below, in a particular embodiment the valve and valve monitor may further comprise a mechanical linkage or part thereof preventing access to the interior of the valve unless the valve is in a designated position. Advantageously, in this particular embodiment, the anti-tamper quality is conferred by movement of the valve concomitantly moving the mechanical linkage or part thereof.

In one embodiment, the inventor has provided a redesign of conventional Class B valves such that it is impossible to tamper with the switch and thereby converts the valve into Class A. While the conversion does not solve drilling, breaking the valve or other similar destructive attacks, it is generally accepted that these types of destructive attacks are well beyond any definition of anti-tamper.

Figure 1B:
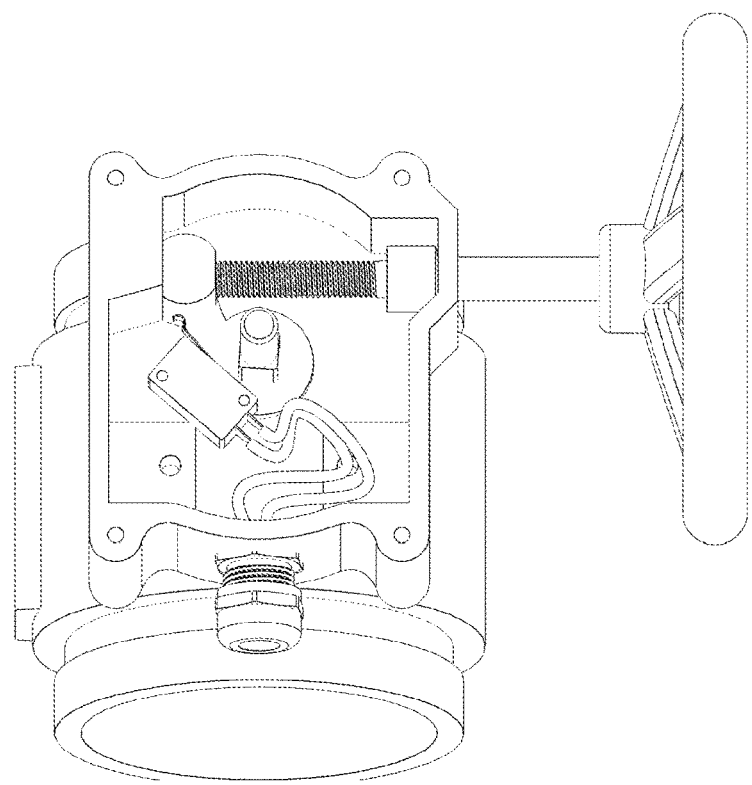

FIGS. 1A and 1B show a prior art Tyco Model BFV-300 butterfly valve, which is an FM (Factory Mutual) and UL (Underwriters Laboratory) approved valve used extensively in fire protection globally.

This Tyco Model BFV-300 butterfly valve has an internal micro switch which is easy to defeat because the cover plate can be removed. A valve with the cover plate removed is shown in FIG. 1B. With the cover plate removed the switch can be jammed closed, then the valve can be isolated without an alarm being generated.

Figure 1C:
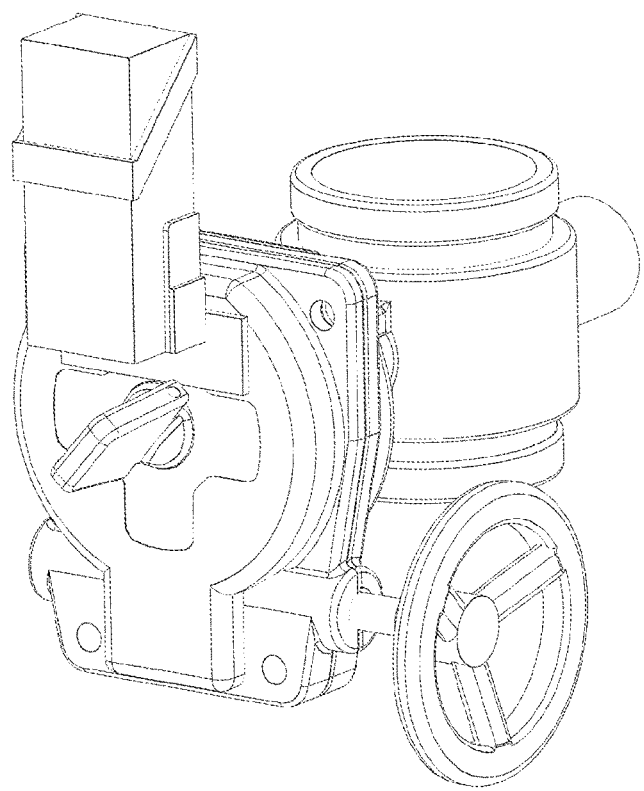
FIG. 1C: shows a prior art conversion of a class B valve to class A.

FIG. 1C shows an external electronic device which can be fitted to the Tyco Model BFV-300 to convert it from Class B to Class A. The addition of this device requires some modification to the parent valve and increases the cost.

The inventor has advantageously provided a modification to this type of valve which converts it from Class B to Class A. This conversion requires only two components and does not require any drilling or tapping or modification to the valve except for removal of the existing microswitch arrangement.

Figure 2A:
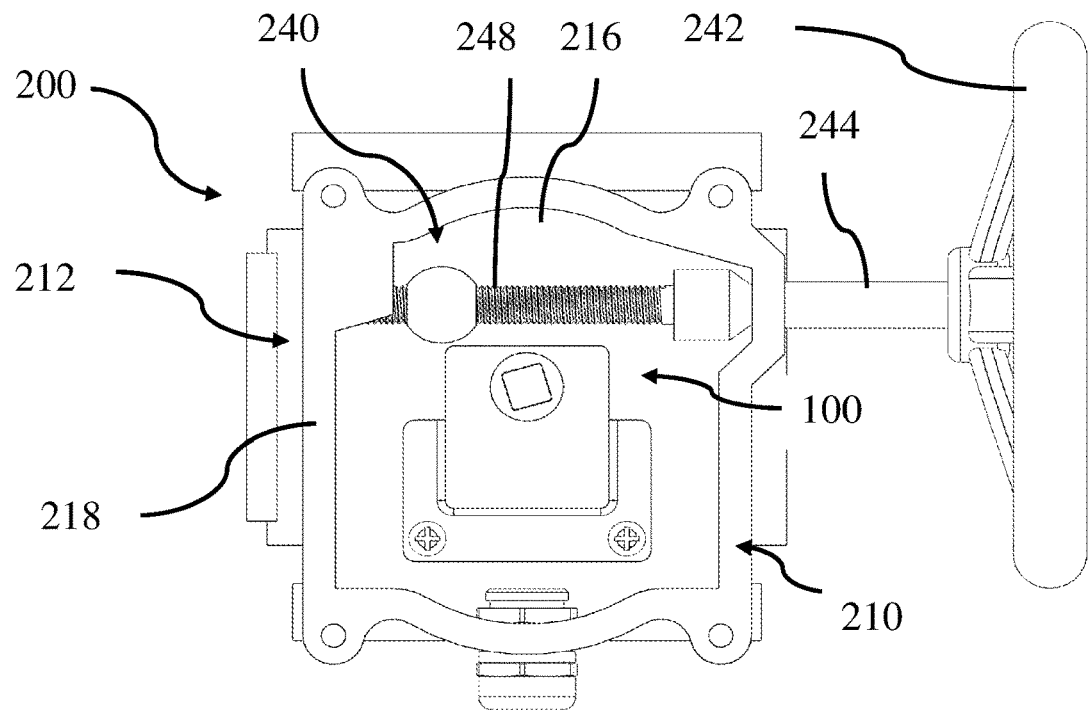
FIGS. 2A; 2B; 2C; 2D; 2E; 2F; 2G; 2H and 2I: show one embodiment of a valve monitor and valve according to the invention.

One embodiment of the invention is shown in FIG. 2 (herein a reference to FIG. 2 includes reference to each of FIGS. 2A; 2B; 2C; 2D; 2E; 2F; 2G and 2I). FIG. 2A shows a schematic top perspective view of valve 200 with valve cover 214 (see FIG. 2G) removed from housing or gearbox 210, to expose the internal components held in valve case 212. The valve case 212 is formed from base 216 and continuous wall 218. As will become clear from the description below valve 200 houses valve monitor 100.

Figure 2B:
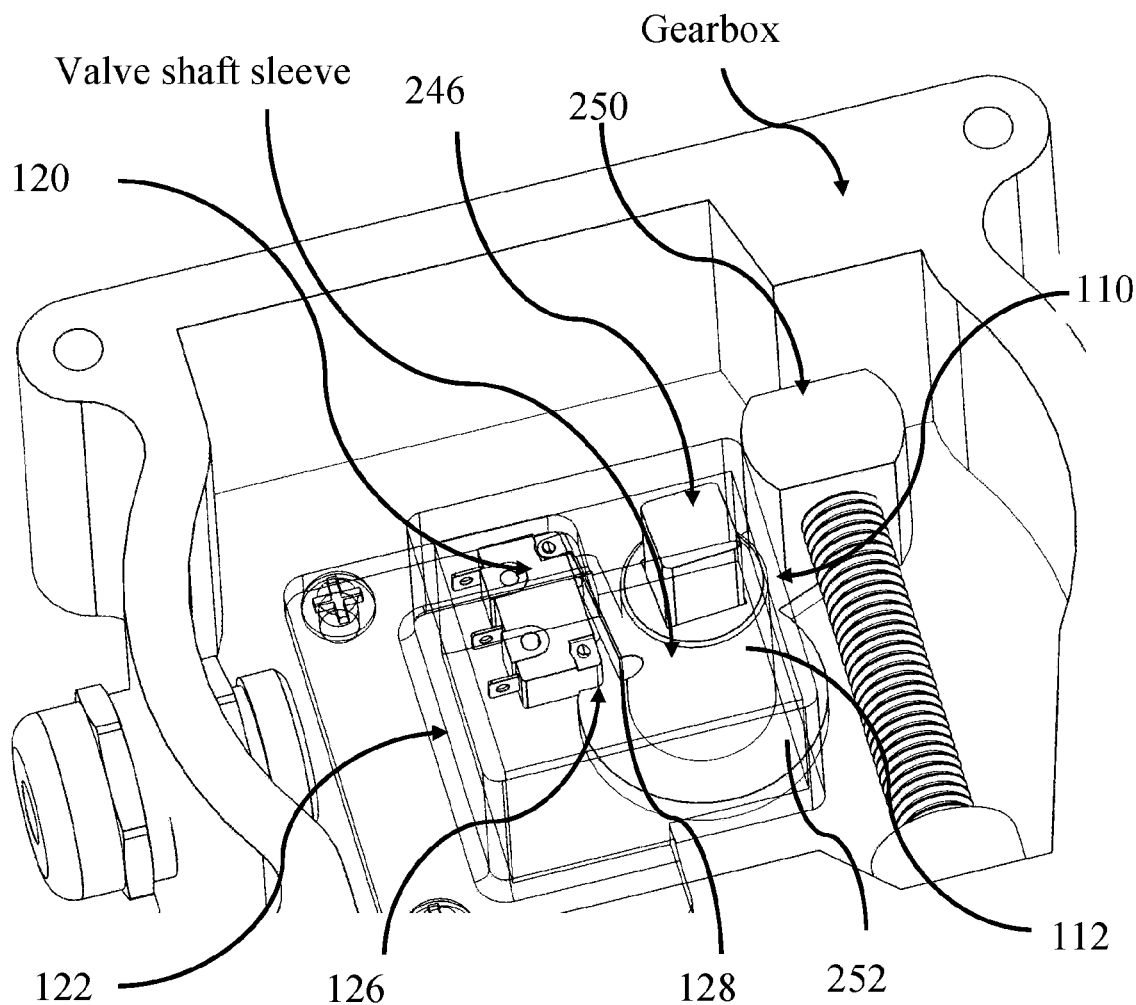
Figure 2C:
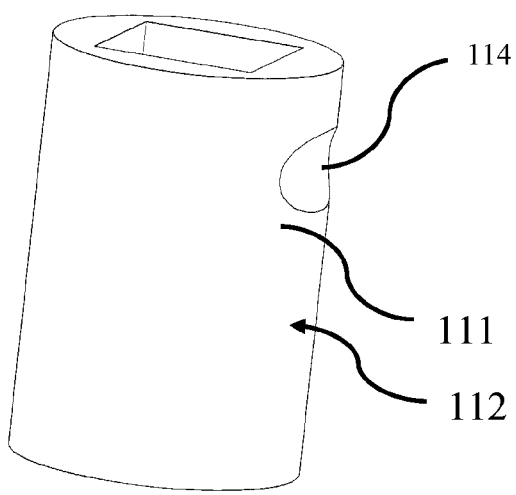
Figure 2D:
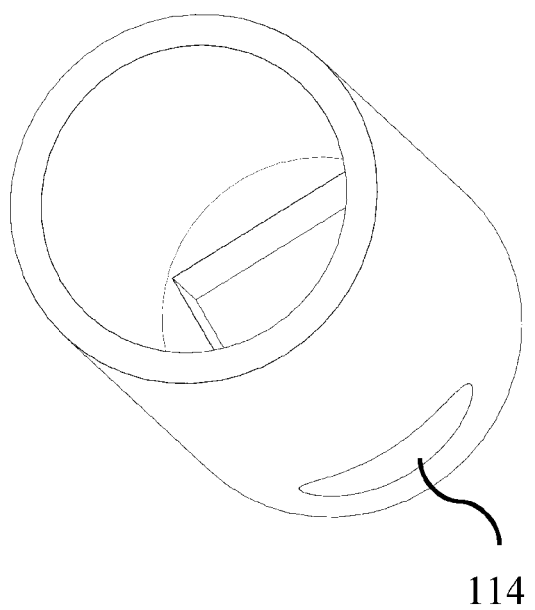

FIG. 2B is another schematic diagram, this one with switch box 122 shown in phantom and providing a close-up view of part of the interior of housing 210, showing one embodiment of a tamper prevention actuator 110, in the form of steel sleeve 112, which fits over the square main valve drive shaft 246. As can be seen in the perspective views of sleeve 112 provided by FIGS. 2C and 2D, sleeve 112 comprises a contact surface 111 and a fenestration 114 dimensioned to suit switch 120.

As shown in FIGS. 2A and 2B, switch 120 is triggered by movement of main valve drive shaft 246. This means that switch 120 is triggered directly by movement of valve 200 and not by some related or interrelated or interconnected action. In this way, when valve mechanism 240 is operated by turning valve handle 242, valve handle drive shaft 244 is rotated, which in turn rotates helical groove 248. This rotation moves valve actuator 250, and thereby cam 252, which rotates main valve drive shaft 246, which leads directly to the opening and closing of valve member 260 (not shown) in conduit 400 (see FIG. 7C) and concomitantly movement of sleeve 112. This movement of sleeve 112 is a rotation from a position in which switch actuator 126 protrudes into fenestration 114, so that no contact is made with tamper prevention actuator 110, to a position in which switch actuator 126 is no longer aligned with fenestration 114 and instead impacts contact surface 111. The switch actuator 126 is shown in FIGS. 2B and 2F to be in the form of a lever 128.

Figures 2E, 2F:
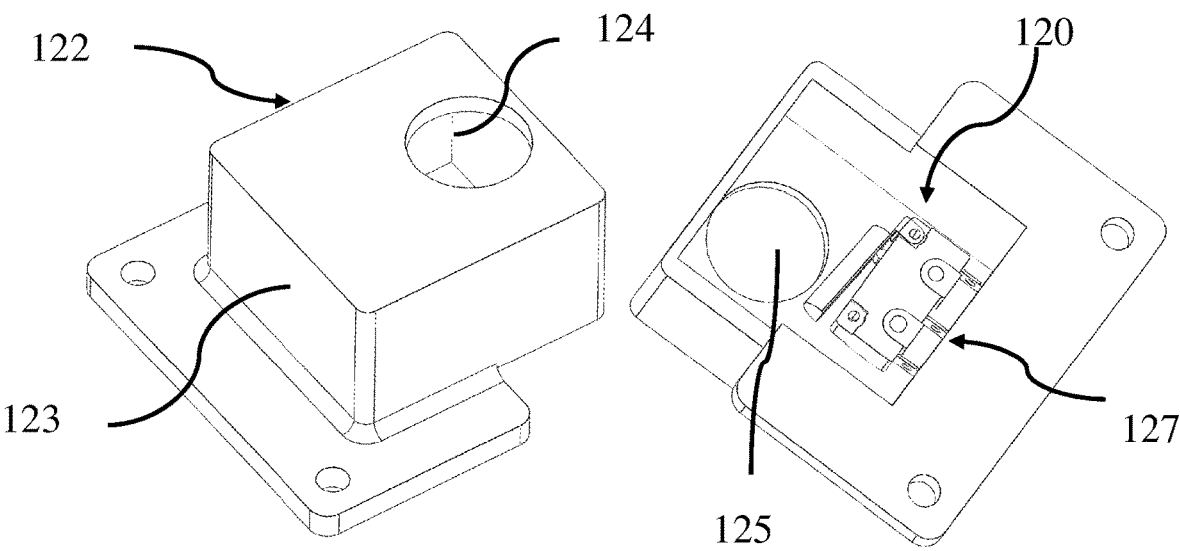

FIGS. 2E and 2F provide perspective views of switch box 122, which houses switch 120. Switch box has a sidewall 123, which forms cavity 125, in which switch actuator 126 and sleeve 112 are disposed. An access port 124 is provided for main valve drive shaft 246, and if required, as determined by the relative dimensions, sleeve 112 to extend out of switch box 122.

The two smaller holes on the switch box 122 are for receiving a fastener such as a screw and are positioned to fit into existing holes in the valve housing 210 so no drilling or tapping is required. The switch box 122 may be installed simply by pushing it over the main valve drive shaft 246 and sleeve 112 and fastening to housing 210 with two screws in the existing holes. The contoured switch actuator 126 will automatically locate and align in fenestration 114 when the valve 200 is in the fully open position. The wiring of the one or more connection 127 to switch 120 runs out underneath switch box 122 and may terminate in a terminal block in the housing 210. The terminal block facilitates the connection of the signal wire to a Fire Indicator Panel.

The switch actuator 126 comprises a contoured outer surface, shown to be convex, which sits in fenestration 114. Unscrewing switch box 122, and moving in any direction will close switch 120 and generate an alarm. From the teaching herein, the skilled person is readily able to select complementary shapes and dimensions for tamper prevention actuator 110 and switch actuator 126.

Figure 2G:
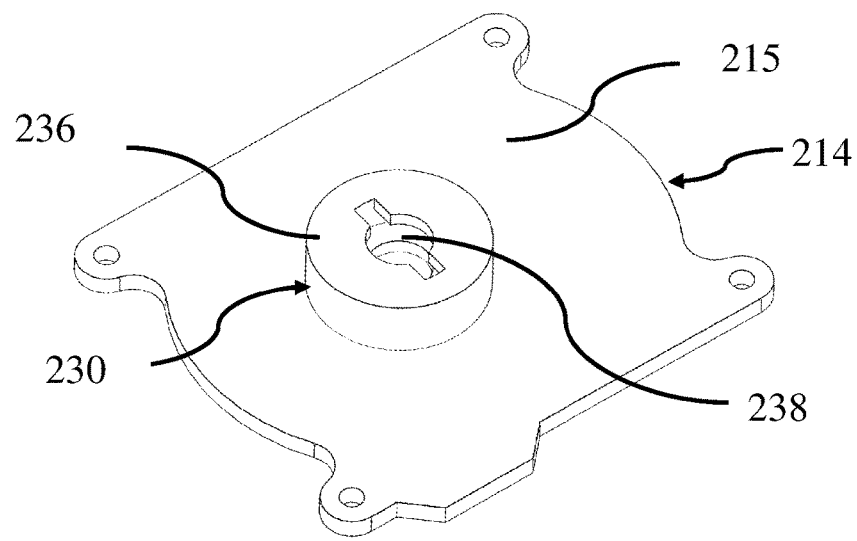

FIG. 2G is a perspective view of the underside of valve cover 214 according to another embodiment of the invention. A housing mechanical linkage or part thereof 230 is shown in the form of a boss 236 disposed on the inside surface 215 of valve cover 214. In this embodiment, housing mechanical linkage or part thereof 230 is part of a bayonet linkage with boss 236 housing a slot 238 dimensioned to receive one or more pin 296 disposed on main valve drive shaft 246. In other embodiments, the valve mechanical linkage or part thereof 290 may comprise a cap 294 (not shown) for simple installation on main valve drive shaft 246.

Slot 238 is dimensioned so that valve mechanical linkage or part thereof 290 (see FIG. 2I), including pins 296, may be inserted in an entry orientation and then rotated into another orientation which does not allow removal. To then remove the valve mechanical linkage or part thereof 290 from the mechanical linkage 280, the main valve drive shaft 246 must be rotated back to the entry orientation. This rotation can only happen with concomitant closing and opening of valve 200.

As is typical of bayonet linkages, the slot 238 may comprise respective one or more L-shape or T-shape locking track 239 (see FIG. 7G) to restrict further movement of the one or more pins 296.

Figure 2H:
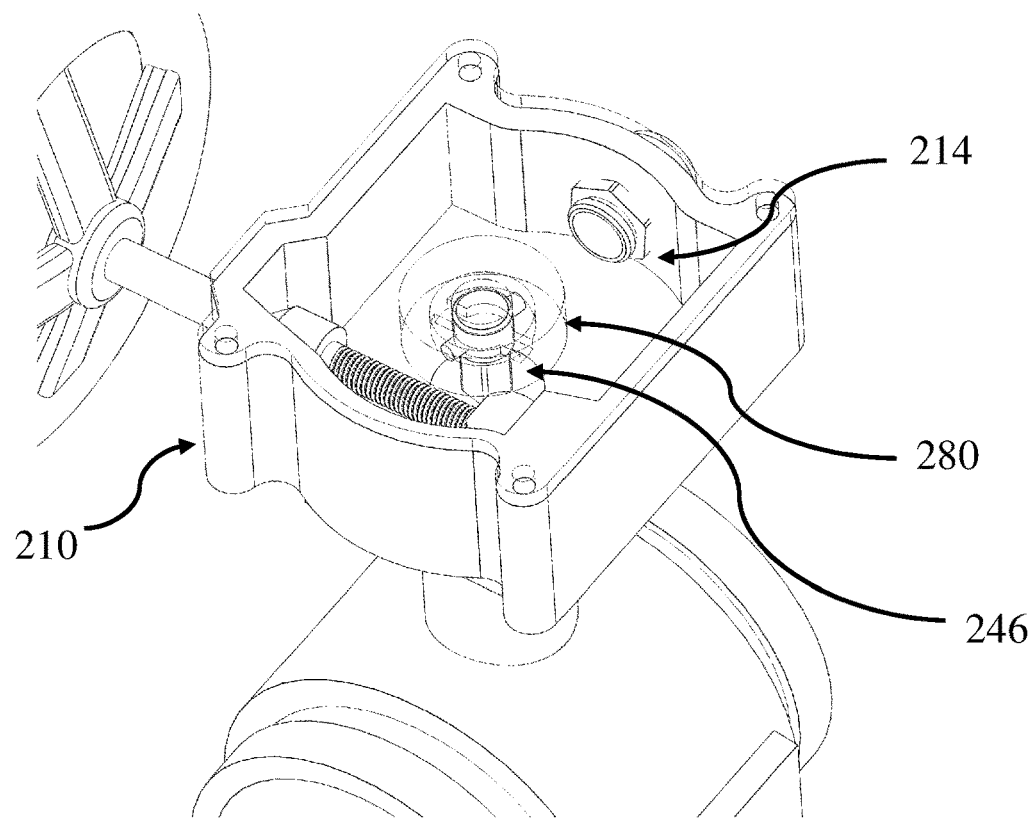
Figure 2I:
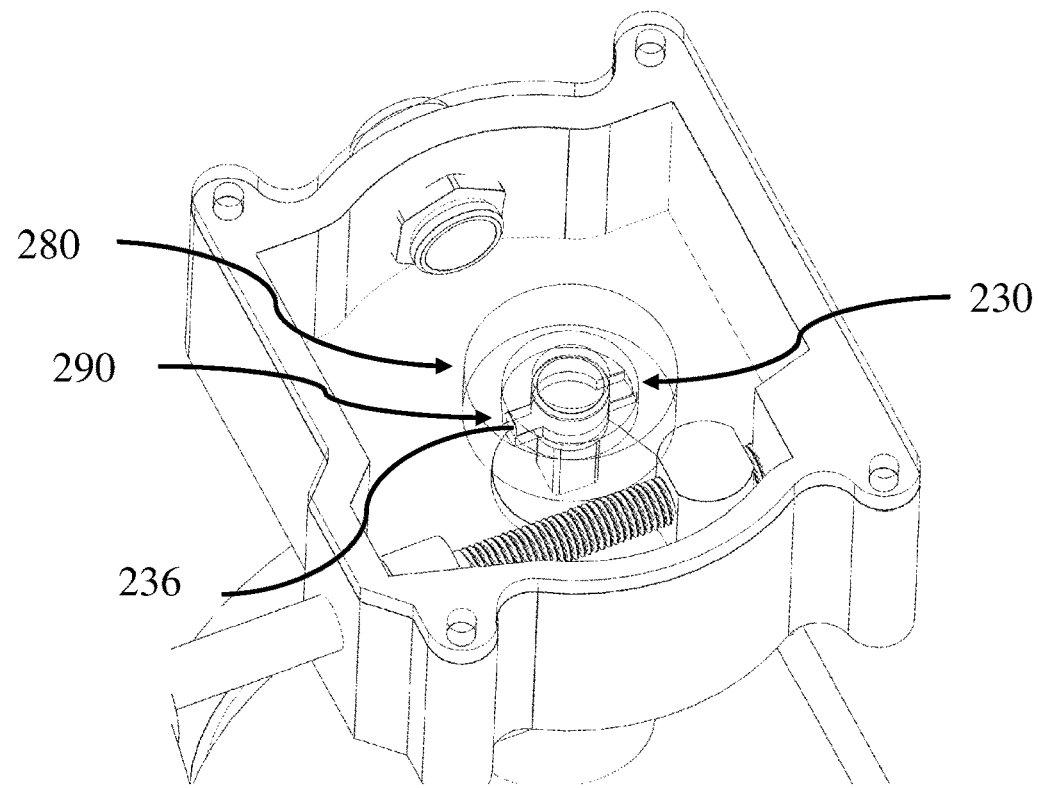

FIGS. 2H and 2I show top perspective views of housing 210, in which valve cover 214 is shown in phantom to allow visualisation of mechanical linkage 280 including one or more pins 296. In another embodiment, pins 296 may extend from sleeve 112.

FIG. 2H shows the mechanical linkage 280 in an access orientation which allows valve cover 214 to be taken on and off and which thereby allows access when the valve 200 is in the desired position. In this access orientation, the one or more pin 296 of the valve mechanical linkage or part thereof 290 is seated in slot 238 and extraction of valve mechanical linkage or part thereof 290 from housing mechanical linkage or part thereof 230 is possible because one or more pin 296 has not been rotated into one or more locking tracks 239.

FIG. 2I shows mechanical linkage 280 rotated into the secure orientation which prevents access to valve 200 when the valve is not in the desired position. The embodiment shown is FIG. 2I is configured so that valve 200 may be accessed when it is closed. In this secure orientation, the one or more pin 296 of the valve mechanical linkage or part thereof 290 has been rotated from a position seated in slot 238 into the one or more locking tracks 239 so that extraction of valve mechanical linkage or part thereof 290 from housing mechanical linkage or part thereof 230 is not possible.

While the mechanical linkage 280 shown in FIG. 2 is a bayonet linkage, from the teaching herein the skilled person is readily able to select other suitable linkage types.

The inventor has advantageously provided a modification in which housing 210 incorporates a switch 120 which makes it impossible to remove cover 214 by virtue of an internal locking mechanism, in the form of mechanical linkage 280, that is directly coupled to the main valve drive shaft 246. This means, the only way to gain access to switch 120 is to first shut the valve 200, and this will generate an alarm, identifying that someone has tampered with the valve 200.

Advantageously, the conversion shown in FIGS. 2A; 2B; and 2C is suitable for other commercially available valves such as, Victaulic, Reliable and Viking fire protection butterfly valves, this is because the operational mechanisms are similar or identical. From the teaching herein, the person of skill in the art readily understands that some modification of the sleeve 112 and or switch box 122 or access port 124 such as, their dimensions and relative positioning, may be need for each valve type.

This highlights another advantage of the invention, which his that a cost-effective, basic kit can supplied for a retro-fitted to any installed Class B valve, to convert the valve into Class A.

Figure 4C:
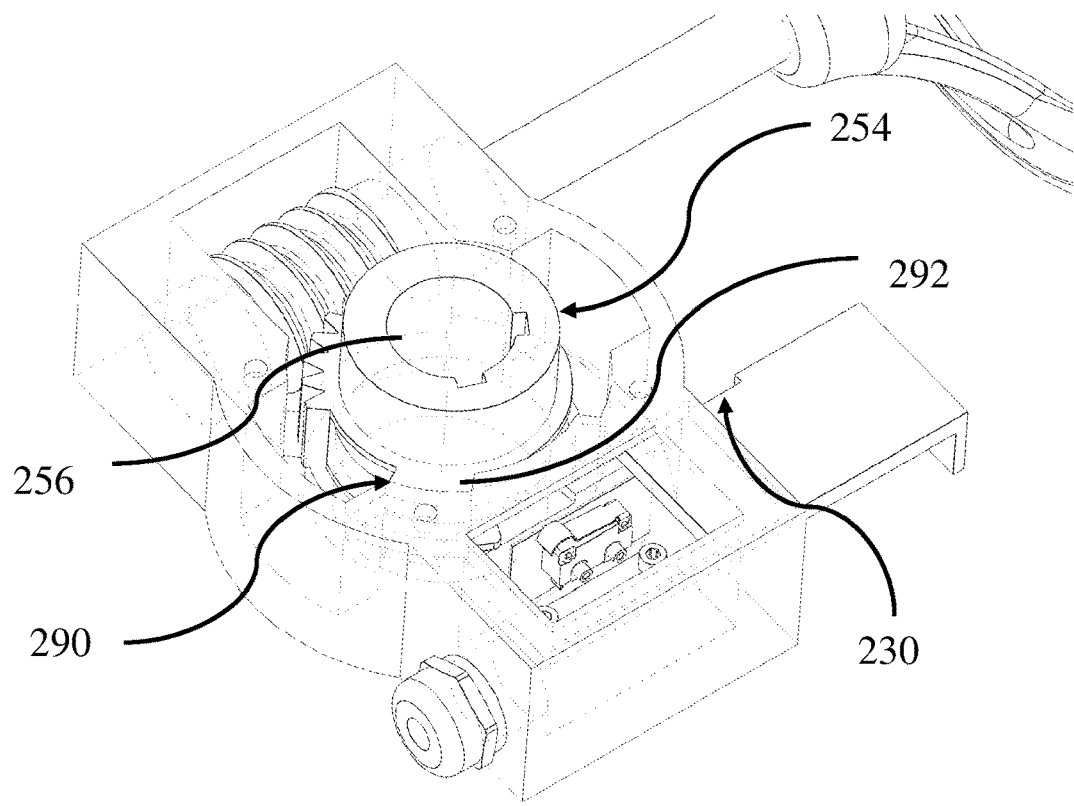
FIGS. 4A; 4B; 4C; and 4D: show another embodiment of a valve and valve monitor according to the invention.
Figure 4D:
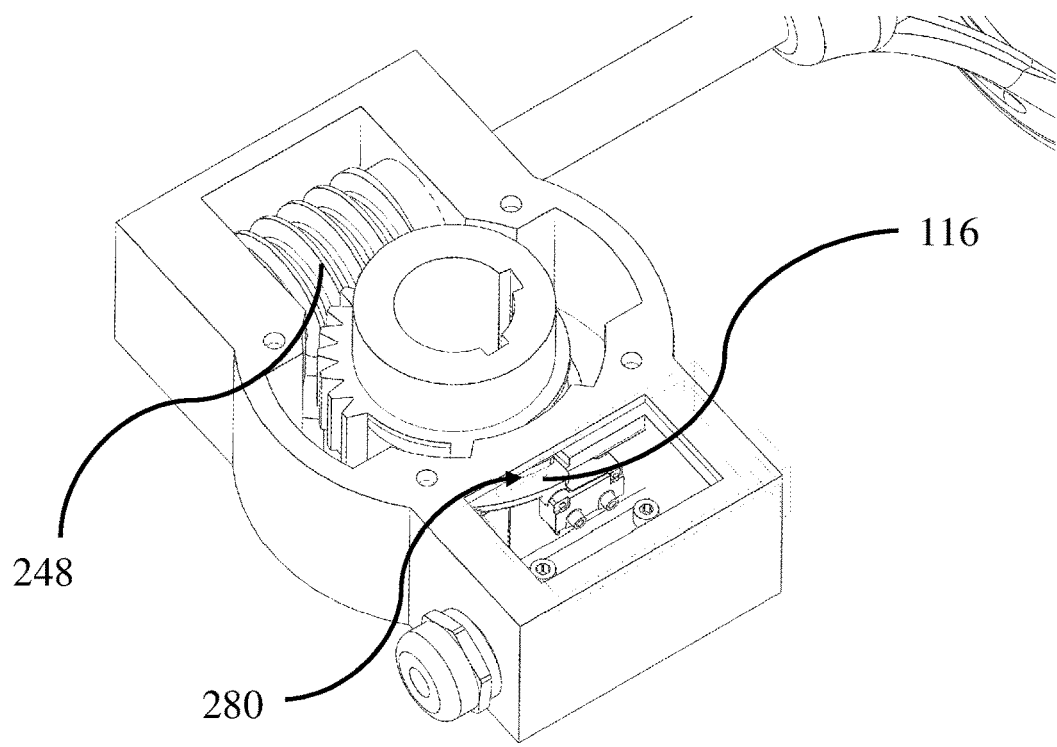

Another embodiment of the invention is shown in FIG. 4 (herein a reference to FIG. 4 includes reference to each of FIGS. 4A; 4B; 4C; and 4D), which is suitable for installation on valves 200 such as, the "Dura" gear operated valves commonly fitted in water supply arrangements throughout Australia. The valve of FIG. 4 can be contrasted with the prior art valve of FIG. 3.

In the embodiment shown in FIG. 4, tamper prevention actuator 110 comprises alarm flange 116 which in this embodiment is integral with valve actuator 250. In other embodiments, tamper prevention actuator 110 may be in the form of a sleeve, like sleeve 112, mounted on valve actuator 250 or main valve drive shaft 246.

With reference to FIG. 4, switch 120 is triggered when valve mechanism 240 is operated by turning valve handle 242, so that valve handle drive shaft 244 is rotated, which in turn rotates helical groove 248. This rotation moves valve actuator 250, in the form of gear 254, which rotates main valve drive shaft 246 (not shown in FIG. 4, see instead FIGS. 2B and 7C), which leads directly to the opening and closing of valve member 260 (not shown) and concomitantly movement of alarm flange 116. Although not shown in FIG. 4, main valve drive shaft 246 is received in the annulus 256 of gear 254.

The movement of the alarm flange 116 is from a position in which no contact is made with switch 120 to a position in which contact is made with switch 120 or from a position in which contact is made with the switch 120 to a position in which no contact is made with switch 120. Either movement may trigger the alarm.

In the embodiment of FIG. 4, valve mechanical linkage or part thereof 290 is in the form of linkage flange 292 which extends from valve actuator 250. The linkage flange 292 moves from a position in which there is no inter-fitting between the valve mechanical linkage or part thereof 290 and the housing mechanical linkage or part thereof 230 in the desired position and a position in which there is inter-fitting between the valve mechanical linkage or part thereof 290 and the housing mechanical linkage or part thereof 230 when the valve 200 is not in the desired position. The inter-fitting prevents removal of the valve cover 214. The inter-fitting is via relief 234 in valve cover 214. In the embodiment shown in FIG. 4, valve cover 214 is in the form of a housing insert 232 which is a sliding door or sliding access panel. Alarm flange 116 is shown to extend further than linkage flange 292.

In the access position, the linkage flange 292 of the valve mechanical linkage or part thereof 290 is not seated in relief 234 and extraction of valve mechanical linkage or part thereof 290 from housing mechanical linkage or part thereof 230 is possible because linkage flange 292 has not been rotated into relief 234.

In this secure position, the linkage flange 292 of the valve mechanical linkage or part thereof 290 has been rotated into a position seated in relief 234 so that extraction of valve mechanical linkage or part thereof 290 from housing mechanical linkage or part thereof 230 is not possible.

Figure 5A:
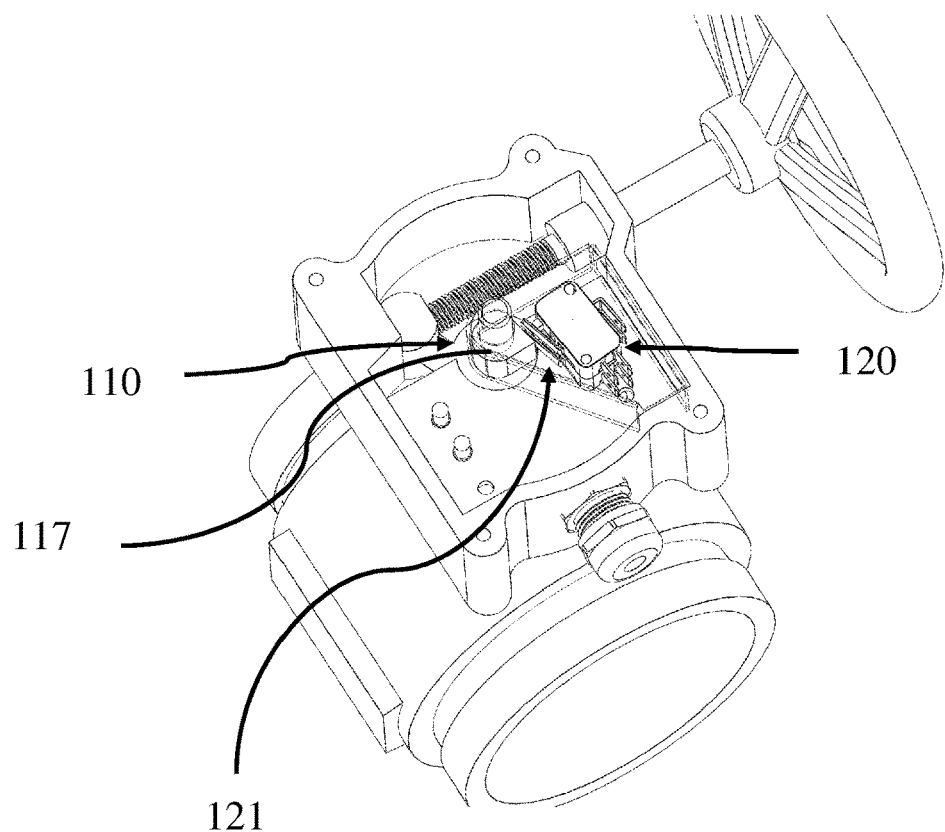
FIGS. 5A; and 5B: show yet another embodiment of a valve and valve monitor according to the invention.
Figure 5B:
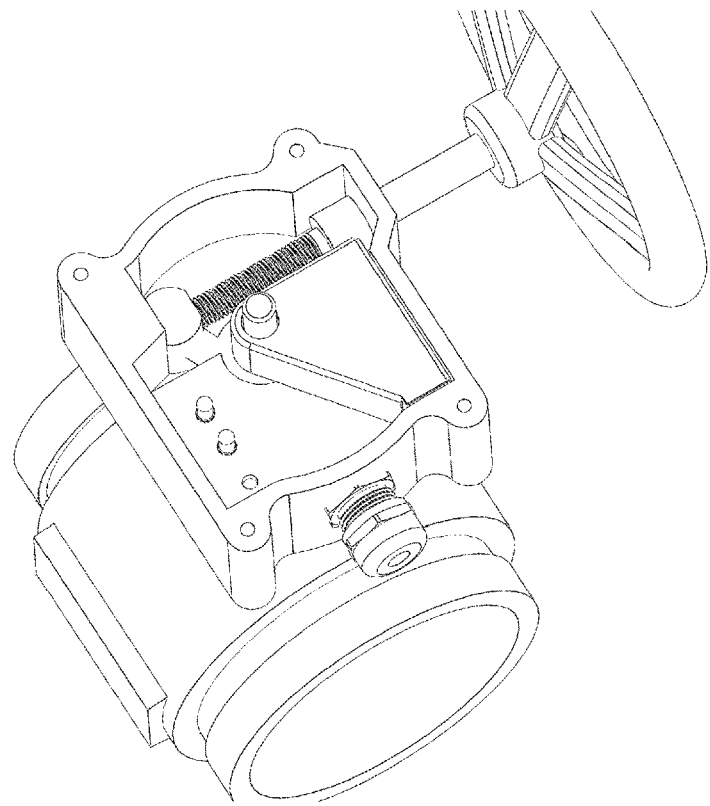

FIGS. 5A and 5B show an embodiment in which switch 120 comprises a biasing mechanism 121 which the tamper prevention actuator 110 must act against to activate the switch 120. In FIG. 5A, which shows the switch box 122 in phantom, the biasing mechanism 121 is shown in the form of two spring levers positioned between the tamper prevention actuator 110 and the switch actuator 126.

The embodiment of FIGS. 5A and 5B is of particular advantage because it prevents an attack in which the gearbox or housing 210 is unbolted from the rest of valve 200, which would provide direct access to the main valve drive shaft 246. This access could be used to simply turn the main valve drive shaft 246, for example with a wrench to open or close valve 200 in an unauthorised manner. With the gearbox or housing 210 no longer attached to the main valve drive shaft 246, the alarm would not be triggered.

If such an attack were made on the embodiment shown in FIGS. 5A and 5B, the tamper prevention actuator 110, in the form of cam 117, would simply fall away, and would in fact be pushed away by biasing mechanism 121, which opens switch 120 and generates the alarm.

Further highlighting the advantageous nature of the invention is that, if some attempts to remove switch 120 or a part thereof such as, switch box 121, the switch will open as the cam 117 remains on the main valve drive shaft 246 which generates the alarm.

Figure 6:
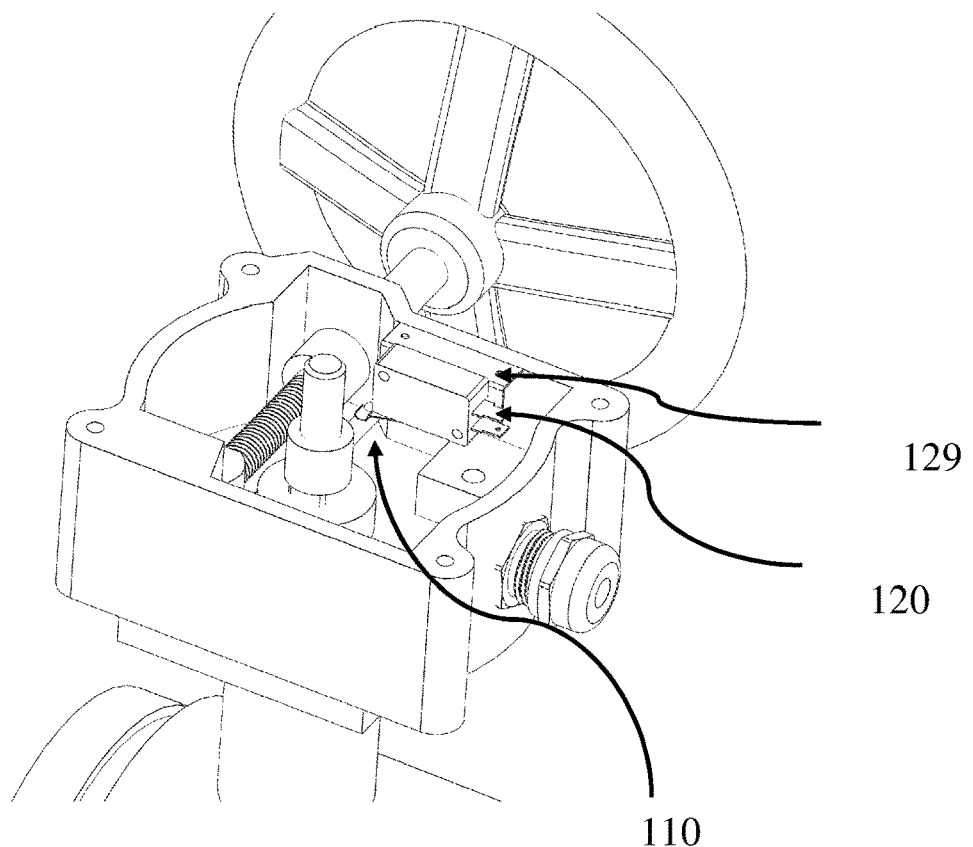
FIG. 6: shows still another embodiment of a valve and valve monitor according to the invention.

FIG. 6 shows an embodiment in which switch 120 is disposed on the inside surface 215 of valve cover 214 such that switch actuator 126 is in contact with the inside surface 215 of valve cover 214. Switch 120 is attached with one or more switch fastener 129 which in this embodiment comprises a bracket and two screws (not shown).

This embodiment is particularly advantageous because it allows a simple and cost-effective anti-tamper alarm. As soon as valve cover 214 is removed, switch actuator 126 no longer makes contact with inside surface 215 which triggers the alarm.

Figure 7A:
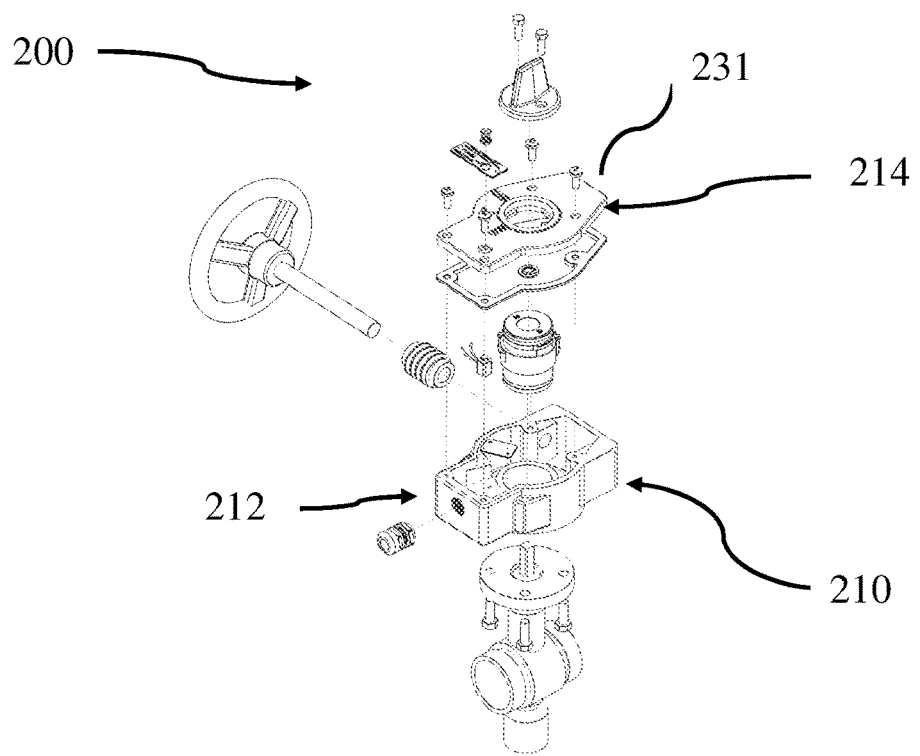
FIGS. 7A; 7B 7C; 7D; 7E; 7F; 7G; 7H and 7I: show an anti-tamper valve according to other embodiments of the invention.
Figure 7B:
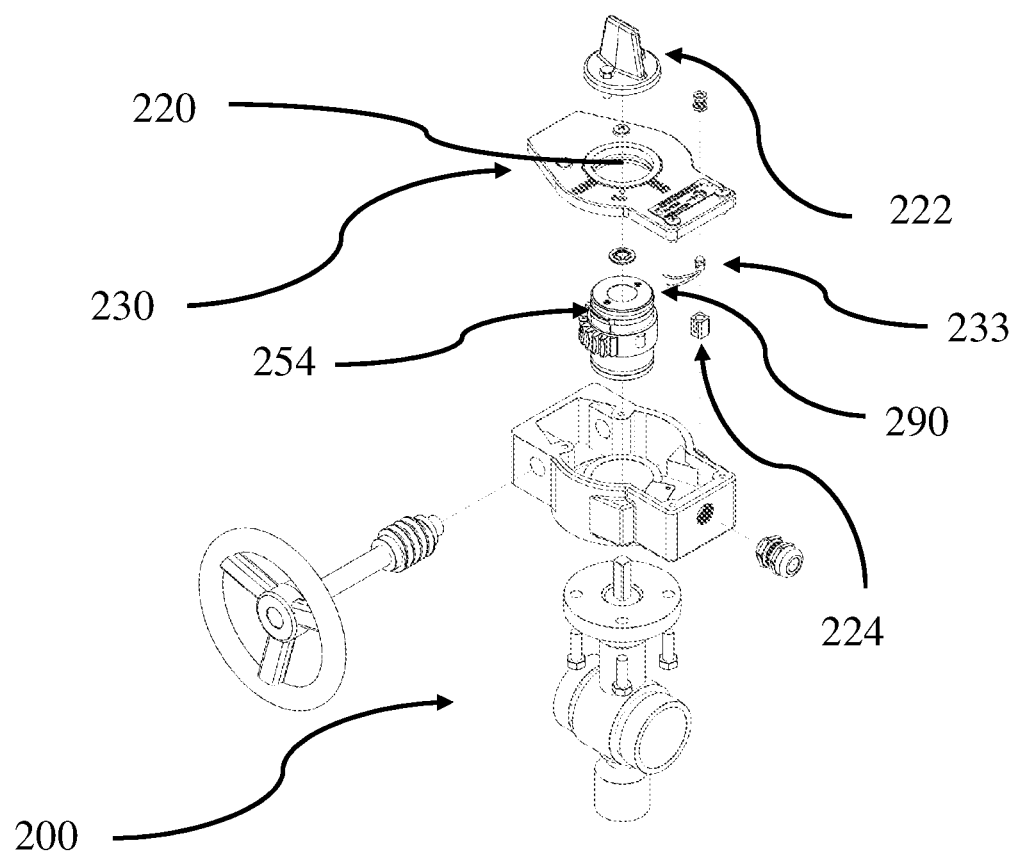

FIGS. 7A and 7B are exploded views, showing a tamper resistant valve 200 according to another embodiment of the invention. Valve 200 comprises a valve housing 210 comprising a valve case 212 and a valve cover 214. The valve case 212 is shown to comprise a base 216 and a wall 218. The valve cover 214 is removable from the valve case 212 and it defines a housing mechanical linkage or part thereof 230.

Also shown is gear 254 comprising an annulus 256 for fitting onto main valve drive shaft 246, the gear 254 also comprising a valve mechanical linkage or part thereof 290 for inter-fitting with the housing mechanical linkage or part thereof 230 so the valve cover 214 can only be removed when the valve mechanical linkage or part thereof 290 and the housing mechanical linkage or part thereof 230 are in an access orientation and not a secure orientation.

Although gear 254 is shown to comprise teeth, in other embodiments gear 254 may take any suitable form such as a gear with no teeth, a sleeve or a component disposed on or integral with the main valve drive shaft 246. The gear may be a one-piece component or may be comprised of two or more pieces. The two or more pieces may be disposed in different heights along the main valve drive shaft 246. The one-piece gear may have one or more tamper prevention actuator and/or one or more valve mechanical linkage or part thereof disposed at different heights along its length.

In other embodiments, gear 254 may be integral with the main valve drive shaft 246.

Figure 7C:
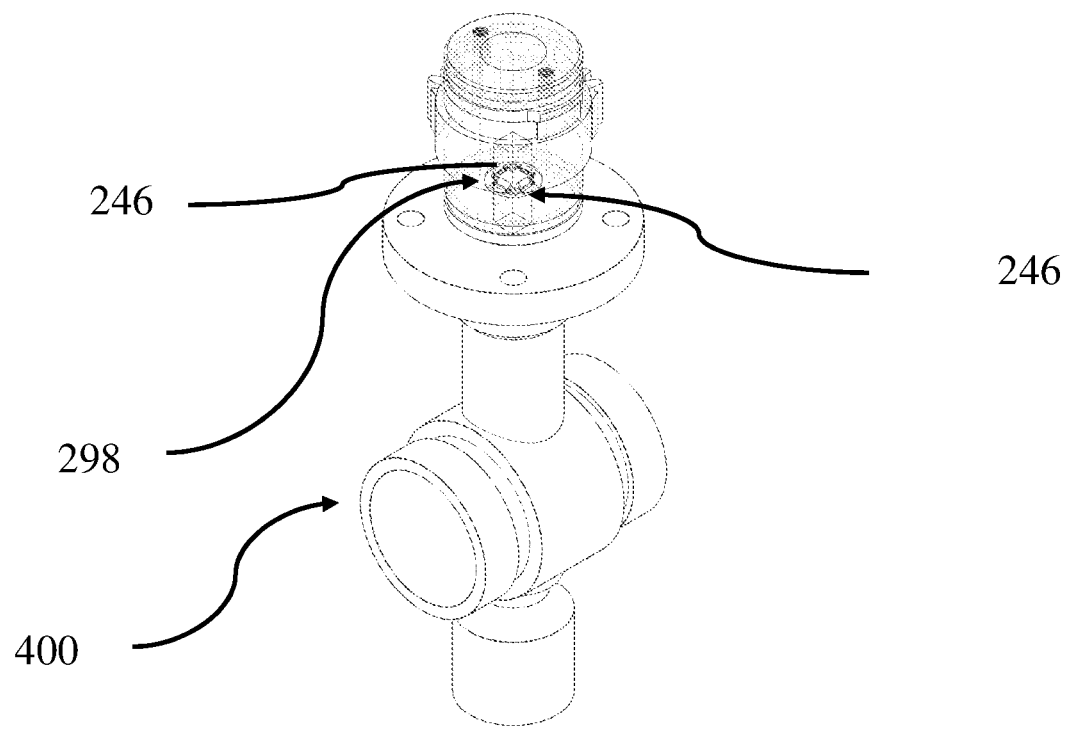
Figure 7D:
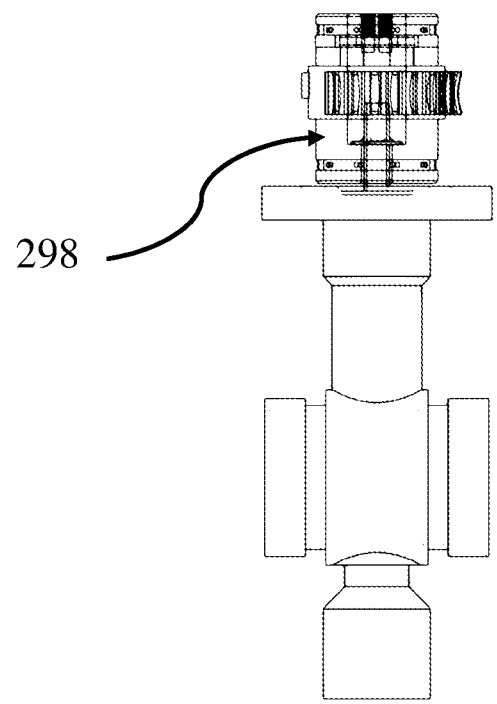
Figure 7E:
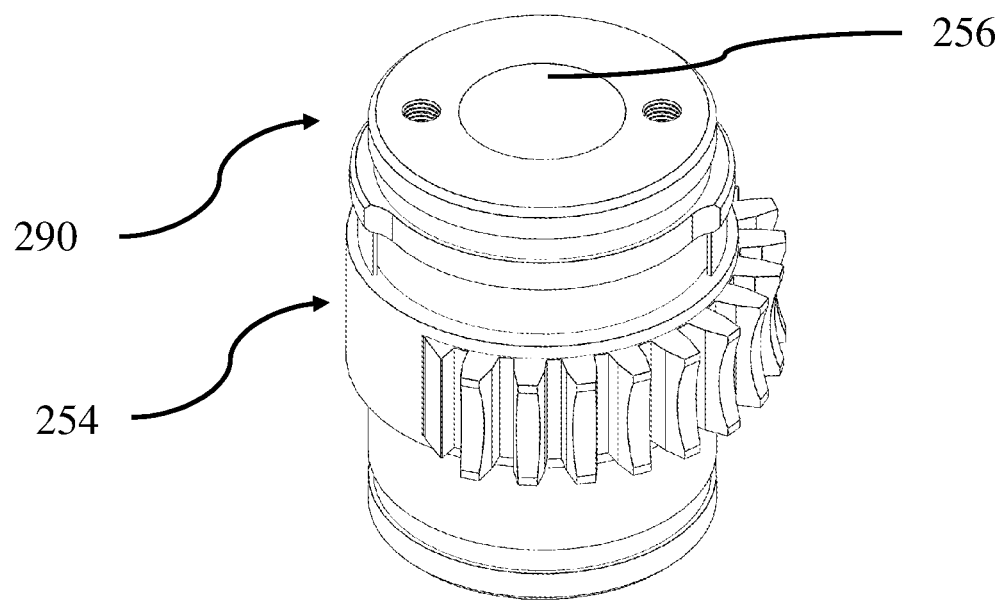

FIG. 7E shows the valve mechanical linkage or part thereof 290 to be two linkage flanges 292 disposed on opposing sides of gear 254.

Figure 7F:
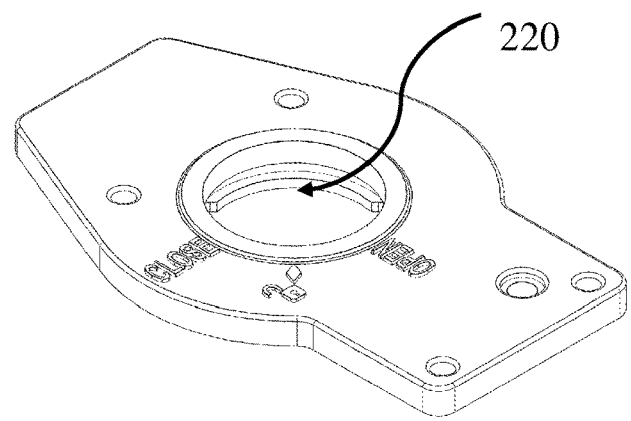
Figure 7G:
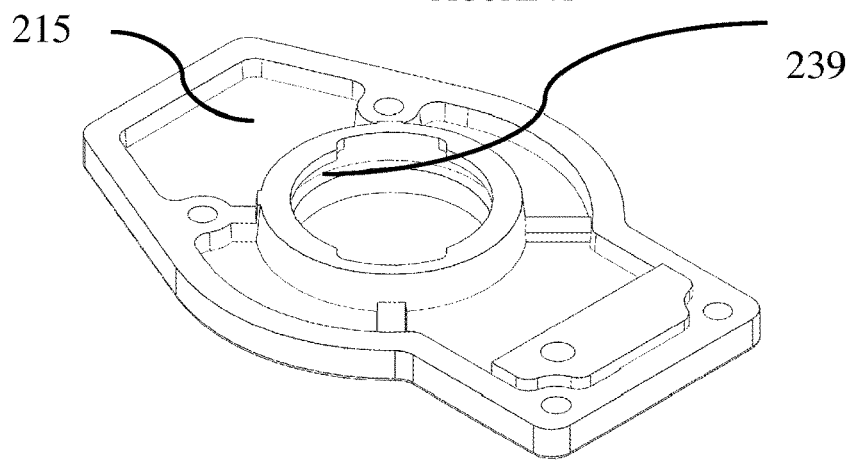
Figure 7H:
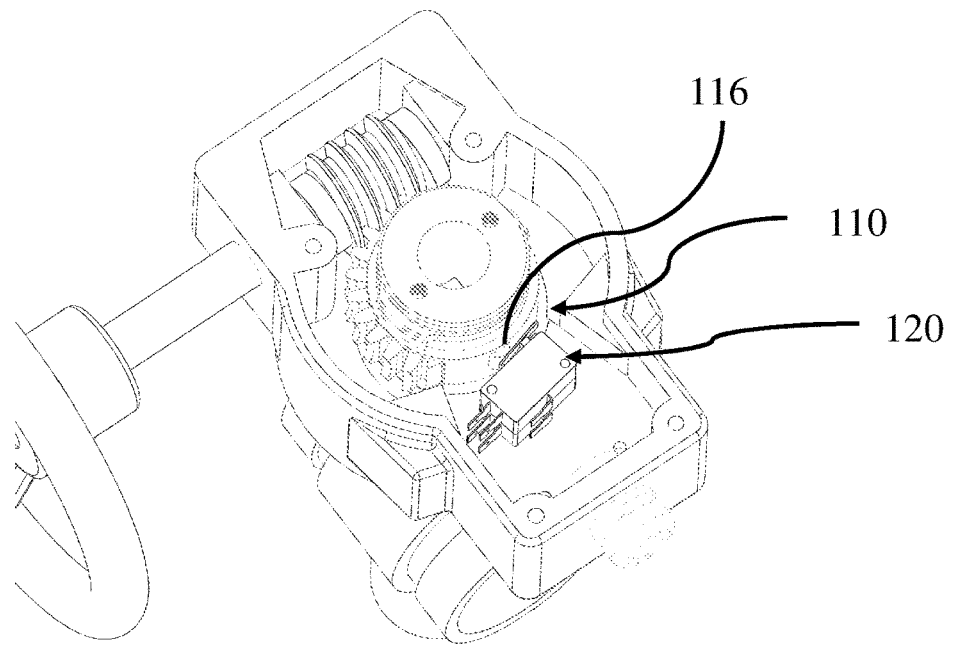
Figure 7I:
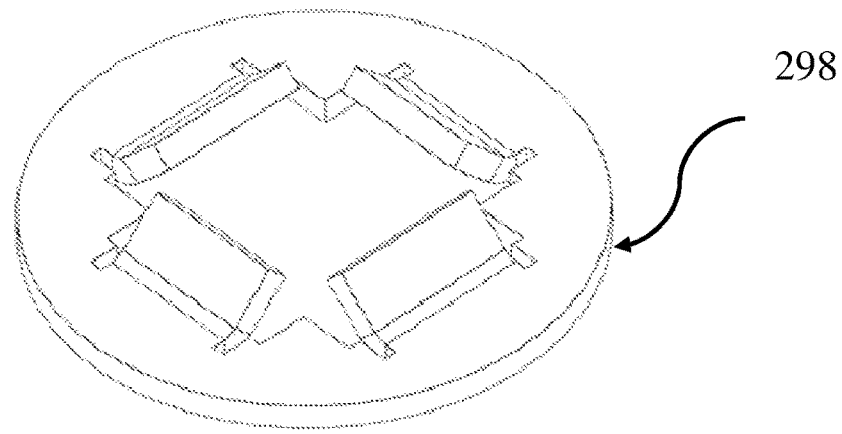
Figure 8A:
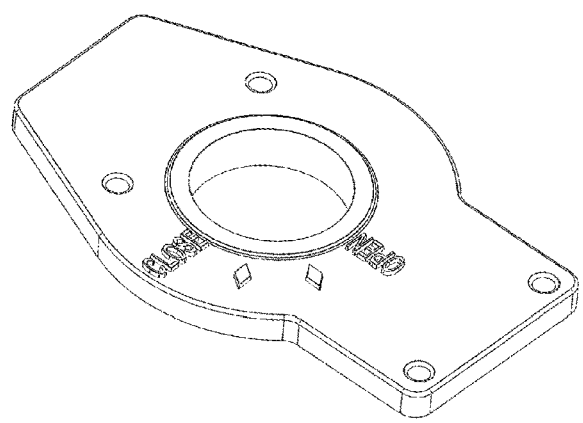
FIGS. 8A and 8B show the top surface and inside surface, respectively, of a prior art valve cover.
Figure 8B:
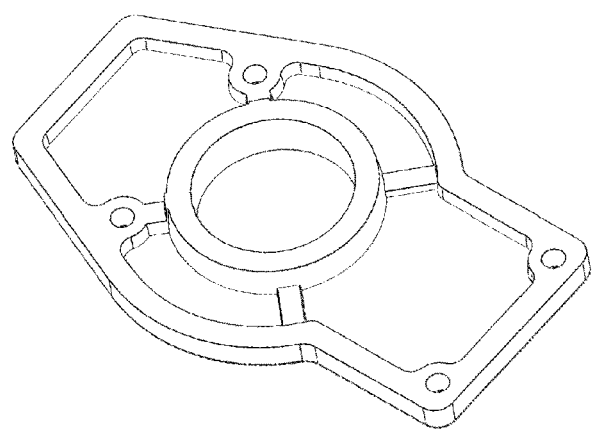

As shown in FIG. 7H the access orientation triggers a switch 120. The switch 120 is disposed to make contact with a tamper prevention actuator 110, which is shown in the form of alarm flange 116. As is understood from the description above, tamper prevention actuator 110 is concomitantly moved with main valve drive shaft 246 rotation. Switch 120 is then triggered by movement of the tamper prevention actuator 110. As such, in the embodiment shown in FIG. 7H, gear 254 defines or comprises tamper prevention actuator 110.

As shown in FIG. 7A, the housing mechanical linkage or part thereof may be defined on an insert 231, the insert 231 adapted to be applied to a valve cover 214. This embodiment is particularly advantageous for retro-fitting or otherwise inclusion on existing cases.

FIG. 7B illustrates a housing mechanical linkage 230 integrated into a one-piece cover 214. Close up views of the one-piece cover are show in FIGS. 7F and 7G, with FIG. 7F showing the top-surface and FIG. 7G showing the inside surface. The close up views of FIGS. 7F and 7G make possible visualisation of the locking tracks 239.

FIG. 7B also shows valve cover 214 to define a valve cover aperture 220, which allows for passage of gear 254, and valve 200 to further comprise an external indicator 222 located on the outside of housing 210 in the form of a knob. Turning the valve hand 242 rotates housing main valve drive shaft 246 and concomitantly the valve mechanical linkage or part thereof 290.

FIG. 7G shows a stopper 226 in the form of a protruding section of casting on cover 214 which prevents cover 214 being turned relative to the case 212. In the embodiment shown, the protruding section sits below the uppermost level of the case 212 and thereby prevents rotation. Advantageously, protrusion prevents rotation of cover 214 to align the mechanical linkage in the access orientation which would allow the cover 214 5 to be lifted off without generating an alarm. While topper 226 is shown in the form of a protrusion or protruding section, from the teaching herein a skilled person is readily able to select other suitable embodiments such as inter-fitting fasteners or mating components.

As shown in FIGS. 7C and 7D a retainer 298 may be applied to main valve drive shaft 246. Advantageously, retainer 298 prevents removal of one or more component from the main valve drive shaft 246. As best seen in the close-up view of FIG. 7I, retainer 298 comprises an anti-tamper retainer or one-way retainer such that once applied it is difficult to remove. The embodiment shown in FIG. 7 is one-way retainer comprising angled flanges which interact with the helical groove 248 of the main valve drive shaft 246 to prevent or hinder removal of the retainer.

In other embodiments, the retainer 298 interacts with one or more mechanical feature disposed on the main valve drive shaft such as, one or more groove or one or more protrusion. For example, retainer 298 may be in the form of a circlip which fits into a groove or fits under one or more protrusion disposed on the main valve drive shaft 246.

The valve 200 may further comprise a visual indicia 233 to indicate switch status. The visual indicia 233 is shown in FIG. 7B to be in the form of a light, embodied as an LED (light emitting diode). The visual indicia may be operatively connected to the switch and/or one or more Fire Alarm Control Panel.

FIG. 7B shows a further advantageous feature, a transparent window 224 comprised in the case 212. The transparent window 224 is positioned to allow viewing of the visual indicia. In the embodiment shown, transparent window 224 is in the form of an IP65 clear lens.

Although valve member is not shown in the figures, conduit 400 is shown in FIGS. 7A; 7B; 7C; 7D; and 7H. These figures make is clear that valve member 260 is disposed to block conduit 400 when valve 200 and valve member 260 and to allow fluid flow through conduit 400 when valve 200 and valve member 260 are open.

In the embodiments of FIGS. 5A; 5B 6 and 7, switch 120 is disposed to be in contact with tamper prevention actuator 110. The tamper prevention actuator 110 is triggered by movement of the main valve drive shaft 244. The switches 120 is configured disposed within valve housing 210 and located so separation of tamper prevention actuator 110 from the switch 120 triggers the switch 120.

While the embodiments of FIGS. 5A; 5B; and 6 show tamper prevention actuator 110 to be fitted on or onto main valve drive shaft 246, in other embodiments tamper prevention actuator 110 is integral with main valve drive shaft 246.

In the embodiments shown in FIGS. 2; 4; 5 and 6, switch 120 is an electronic switch which triggers an alarm. The switch 120 may also be triggered by removal of the valve cover 214. The switch may comprise a trigger. The trigger may be contacted by the tamper prevention actuator.

Although the embodiments shown in FIGS. 2; 4; 5; and 6 comprise only one switch 120, a skilled person is readily able to include other numbers of switches 120, such as two, three, four, five, six, seven, eight, nine or ten switches 120.

Although not shown, the valve monitor 100 and valve 200 shown in FIGS. 2; 4; 5A and 5B may comprise a further switch 150 which is triggered by removal of valve cover 214 or relative movement of valve cover 214 and valve case 212. This further switch 150 may comprise a further switch actuator 152 which contacts valve cover 214 or valve case 212. The further switch may be similar to the switch 120 shown in FIG. 6.

The invention also provides a method of monitoring a fire protection system, such as a fire sprinkler system, the method comprising fitting or retrofitting valve monitor 100 to a valve comprised in the fire protection system or installing valve 200 to the fire protection system.

Further provided is a method of preventing unauthorised access to a fire protection system, the method comprising fitting or retro-fitting switch 120 triggered by valve movement to a shut-off valve within the fire protection system; and providing a valve mechanical linkage or part thereof 290 moveable from a secure position which prevents access to the valve when the valve is not in a desired position and an access position which allows access to the valve when the valve is in the desired position.

Additionally provided is a method of preventing unauthorised access to a fire protection system, the method comprising: installing a shut off valve 200 into the fire protection system, the shut off valve 200 comprising: a housing 210; a valve mechanism 240 and valve monitor 100.

The inventor has also provided a method of manufacturing a valve monitor 100, the method comprising: providing a switch 120 triggered by valve movement; and providing a valve mechanical linkage or part thereof 290.

Further provided is a method of manufacturing a valve 200 comprising: providing a housing 210; providing a valve mechanism 240; and providing a valve monitor 100.

From the teaching herein, it is abundantly clear to the skilled person that the invention also provides a method of fitting or retrofitting valve monitor 100 into a fire protection system and a method of fitting or retrofitting valve 200 into a fire protection system.

The skilled person also readily understands from the teaching herein that the invention provides a kit 300 for converting a valve into a tamper resistant valve, the kit comprising switch 120 to be installed in the valve so that it is triggered by valve movement; and a valve mechanical linkage or part thereof 290.

The advantages of the present invention include the provision of a cost effective solution to provide Class A anti-tamper electronic valve monitoring. Advantageously, a cost effective kit may be supplied to convert valves which have already been installed. Moreover, the installation takes only several minutes.

The elimination, or at least reduction of the Class B category will improve compliance as instances where the wrong type of valve is installed will be eliminated or at least reduced.

Another advantage is that by increasing the anti-tamper protection to Class A monitoring a reduction in insurance premiums may be achieved. Additionally the increase to Class A may reduce the frequency of legislated routine testing and inspection with significant cost savings.

Unlike other solutions, the technology described herein does not modify the electrical alarm equipment at all. Alternate external solutions are susceptible to being mechanically impacted which can cause a false alarm. Also, other solution which are either mounted externally, poorly installation or operate during service, are well known to cause difficulty in resetting the alarm. This is due to alignment issues. The present invention is not subject to these disadvantages because internally mounted switches are fixed robustly and are not known to be difficult to reset In this specification, the terms "comprises", "comprising" or similar terms are intended to mean a non-exclusive inclusion, such that an apparatus that comprises a list of elements does not include those elements solely, but may well include other elements not listed.

Throughout the specification the aim has been to describe the invention without limiting the invention to any one embodiment or specific collection of features. Persons skilled in the relevant art may realize variations from the specific embodiments that will nonetheless fall within the scope of the invention.

The invention claimed is:

1. A method of preventing unauthorised access to a fire protection system, the method comprising:
   fitting or retro-fitting a valve housing comprising a valve case and a valve cover, the valve case comprising a base and a wall, the valve cover removable from the valve case and the valve cover defining a housing mechanical linkage or part thereof; and
   fitting or retro-fitting a gear onto a main valve drive shaft, the gear comprising a valve mechanical linkage or part thereof for inter-fitting with the housing mechanical linkage or part thereof so the valve cover can only be removed when the valve mechanical linkage or part thereof and the housing mechanical linkage or part thereof are in an access orientation and not a secure orientation and wherein the access orientation triggers a switch.

2. A method of manufacturing a tamper resistant valve, the method comprising:
   providing a valve housing comprising a valve case and a valve cover, the valve case comprising a base and a wall, the valve cover removable from the valve case and the valve cover defining a housing mechanical linkage or part thereof; and
   providing a gear for fitting onto a main valve drive shaft, the gear comprising a valve mechanical linkage or part thereof for inter-fitting with the housing mechanical linkage or part thereof so the valve cover can only be removed when the valve mechanical linkage or part thereof and the housing mechanical linkage or part thereof are in an access orientation and not a secure orientation and wherein the access orientation triggers a switch.

3. A tamper resistant valve comprising:
   a valve housing comprising a valve case and a valve cover, the valve case comprising a base and a wall, the valve cover removable from the valve case and the valve cover defining a housing mechanical linkage or part thereof; and
   a gear for fitting onto a main valve drive shaft, the gear comprising a valve mechanical linkage or part thereof for inter-fitting with the housing mechanical linkage or part thereof so the valve cover can only be removed when the valve mechanical linkage or part thereof and the housing mechanical linkage or part thereof are in an access orientation and not a secure orientation and wherein the access orientation triggers a switch.

4. The tamper resistant valve according to claim 3 wherein the switch makes contact with a tamper prevention actuator.

5. The tamper resistant valve according to claim 4 wherein the tamper prevention actuator is concomitantly moved with rotation of the main valve drive shaft.

6. The tamper resistant valve according to claim 5 wherein the switch is triggered by movement of the tamper prevention actuator.

7. The tamper resistant valve according to claim 4 wherein the switch is triggered by movement of the tamper prevention actuator.

8. The tamper resistant valve according to claim 3 wherein the housing mechanical linkage or part thereof is defined on an insert, the insert adapted to be applied to the valve cover.

9. The tamper resistant valve according to claim 3 comprising a retainer for application to the main valve drive shaft.

10. The tamper resistant valve according to claim 9 wherein the retainer prevents removal of the valve case and/or the gear from the main valve drive shaft.

11. The tamper resistant valve according to claim 9 wherein the retainer comprises an anti-tamper retainer or one-way retainer configured to resist removal from the main valve drive shaft once applied thereto.

12. The tamper resistant valve according to claim 11 wherein the one-way retainer comprises one or more angled flange.

13. The tamper resistant valve according to claim 12 wherein the one or more angled flange interacts with a helical groove of the main valve drive shaft to prevent or hinder removal of the retainer.

14. The tamper resistant valve according to claim 9 wherein the retainer may interact with one or more mechanical feature disposed on the main valve drive shaft.

15. The tamper resistant valve according to claim 14 wherein the retainer comprises a circlip.

16. The tamper resistant valve according to claim 3 comprising a visual indicia indicating a status of the switch.

17. The tamper resistant valve according to claim 16 wherein a transparent window is comprised in the case, the transparent window positioned to allow viewing of the visual indicia.

* * * * *